US010013220B2

(12) United States Patent
Suzuki

(10) Patent No.: US 10,013,220 B2
(45) Date of Patent: Jul. 3, 2018

(54) JOB PROCESSING SYSTEM, JOB PROCESSING APPARATUS, CONTROL METHOD OF JOB PROCESSING APPARATUS, PROGRAM, AND STORAGE MEDIUM

(71) Applicant: CANON KABUSHIKI KAISHA, Tokyo (JP)

(72) Inventor: Ryousuke Suzuki, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/296,934

(22) Filed: Oct. 18, 2016

(65) Prior Publication Data

US 2017/0115936 A1 Apr. 27, 2017

(30) Foreign Application Priority Data

Oct. 21, 2015 (JP) ................................ 2015-207190

(51) Int. Cl.
*G06F 3/12* (2006.01)

(52) U.S. Cl.
CPC .......... *G06F 3/1238* (2013.01); *G06F 3/1205* (2013.01); *G06F 3/1222* (2013.01); *G06F 3/1268* (2013.01); *G06F 3/1292* (2013.01)

(58) Field of Classification Search
USPC ........................................................ 358/1.14
See application file for complete search history.

(56) References Cited

U.S. PATENT DOCUMENTS

2008/0231890 A1* 9/2008 Kishi .................... G06F 21/608 358/1.15
2013/0329253 A1* 12/2013 Sasaki .................. H04N 1/0035 358/1.15

FOREIGN PATENT DOCUMENTS

JP 11-348386 A 12/1999
JP 2014-148064 A 8/2014

OTHER PUBLICATIONS

Nakajima et al.; Image Forming Formation Device, and Control Method and Program for the Same; Aug. 21, 2014; Machine Translated Japanese Patent Application Publication; JP2014-148064 Listed on IDS; All Pages.*

* cited by examiner

*Primary Examiner* — Ngon Nguyen

(74) *Attorney, Agent, or Firm* — Canon U.S.A., Inc. IP Division

(57) ABSTRACT

A job processing system includes a job processing apparatus, a mobile information terminal, and an information processing apparatus. The information processing apparatus transmit a job to the job processing apparatus, which stores the job. Information of the stored job is transmitted to the mobile information terminal. The job processing apparatus authenticates a user who logs in the job processing apparatus. The received job information is displayed by the mobile information terminal. The mobile information terminal selects a job to be executed by the job processing apparatus via a plurality of information pieces of displayed jobs. In response to that a user is authenticated by the authentication unit, the instruction unit instructs the job processing apparatus to execute the selected job in association with identification information of the user. The job processing apparatus executes the job instructed and associated with the identification information in response to that the user is authenticated.

16 Claims, 14 Drawing Sheets

FIG.6A

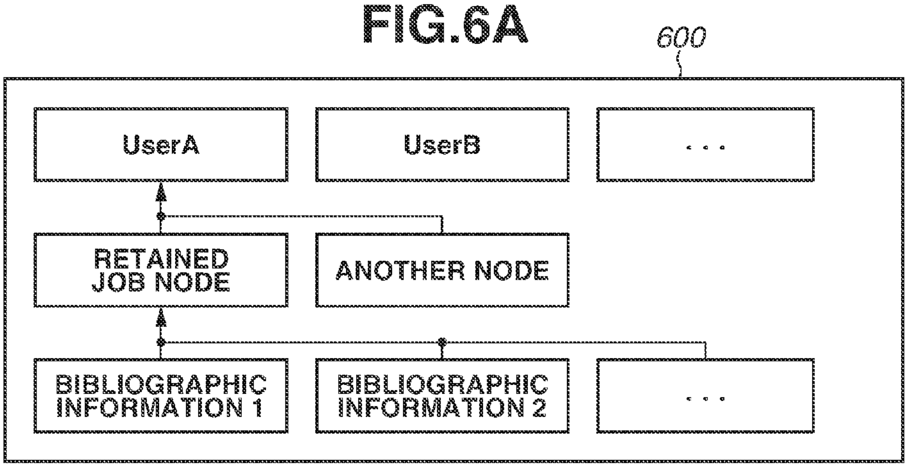

FIG.6B

```
<?xml version="1.0" encoding="UTF-8" standalone="yes"?>
<BiblioData>
 <BiblioInfo>
  <charset>1010</charset>                                   ⎫
  <storedHost>192.168.0.1</storedHost>                       ⎪
  <documentId>000000001</documentId>                         ⎪
  <userId>UserA</userId>                                     ⎪
  <savedDate>2015/06/01 13:00:00</savedDate>                 ⎬ 611
  <documentName>DocumentA</documentName>                     ⎪
  <pageCount>5</pageCount>                                   ⎪
  <copies>1</copies>                                         ⎪
  <colorMode>2</colorMode>                                   ⎭
  ...
  <isPrinted>0</isPrinted>                                   } 612
  ...
   <SettingHistory>                                          ⎫
   <copies>1</copies>                                        ⎪
   <colorMode>2</colorMode>                                  ⎬ 613
   ...                                                       ⎪
  </SettingHistory>                                          ⎭
  </BiblioInfo>
</BiblioData>
```

| USER (701) | TIME (702) | storedHost (703) | DocumentID (704) |
|---|---|---|---|
| USER A | 2015/06/01 13:00 | 192.168.0.1 | 00000001 |
| USER B | 2015/07/01 13:30 | 192.168.0.1 | 00000002 |
| USER B | 2015/07/01 13:32 | 192.168.0.1 | 00000003 |

JOB PROCESSING SYSTEM, JOB PROCESSING APPARATUS, CONTROL METHOD OF JOB PROCESSING APPARATUS, PROGRAM, AND STORAGE MEDIUM

BACKGROUND OF THE INVENTION

Field of the Invention

The present invention relates to a job processing system, a job processing apparatus, a control method of the job processing apparatus, a program, and a storage medium.

Description of the Related Art

An image forming apparatus described in Japanese Patent Application Laid-Open No. 2014-148064 displays, on an operation unit of the image forming apparatus, a list of print data pieces (bibliographic information) of an authenticated user among print data pieces stored (retained) in a hard disk drive (HDD). The image forming apparatus receives a print request to the print data selected by the user from the print data pieces displayed on the operation unit and executes print processing of the print data.

An image forming system described in Japanese Patent Application Laid-Open No. 11-348386 performs wireless communication between an external personal digital assistant (PDA) and a digital copying machine. The PDA issues an access request command to the digital copying machine and instructs the digital copying machine to access and print data on a world wide web (WWW) server.

A user in front of a job processing apparatus selects a job to be executed from among a plurality of jobs stored in the job processing apparatus via a screen of the job processing apparatus and instructs the job processing apparatus to execute the selected job. Thus, the job processing apparatus starts to execute the job selected by the user. In this case, the user keeps occupying the screen of the job processing apparatus until the job to be executed is found from among the plurality of jobs via the screen of the job processing apparatus. Therefore, another user cannot operate the screen of the job processing apparatus for a while.

On the other hand, a user who is apart from the job processing apparatus selects a job to be executed from among the plurality of jobs stored in the job processing apparatus via a screen of a mobile information terminal and instructs execution of the selected job. Thus, the job processing apparatus starts to execute the job selected by the user. In this case, the user is in a place away from the job processing apparatus when the execution of the job is started, so that a job execution result (for example, a print product) is left unattended on the job processing apparatus until the user comes to the front of the job processing apparatus. Therefore, until the user comes to the front of the job processing apparatus, the job execution result (for example, the print product) left on the job processing apparatus may be viewed by another user.

When a job to be executed is searched from among a plurality of jobs and executed, it is desirable that a screen of a job processing apparatus is not kept occupied by a user, and a job execution result (for example, a print product) is not left unattended on the job processing apparatus.

SUMMARY OF THE INVENTION

The present invention is made in consideration of the above-described issues. Aspects of the present invention are directed to the provision of an apparatus, a method, and others which enable a user to select a job to be executed from among a plurality of jobs stored in a job processing apparatus by a mobile information terminal and to instruct execution of the selected job in advance and cause the job processing apparatus to execute the job in response to login of the user.

According to an aspect of the present invention, a job processing system includes a job processing apparatus, a mobile information terminal, and an information processing apparatus, wherein the information processing apparatus includes a first transmission unit configured to transmit a job to the job processing apparatus, wherein the job processing apparatus includes a first reception unit configured to receive the job transmitted by the first transmission unit, a storage unit configured to store the job received by the first reception unit, a second transmission unit configured to transmit information of the job stored in the storage unit to the mobile information terminal, and an authentication unit configured to authenticate a user who logs in the job processing apparatus, wherein the mobile information terminal includes a second reception unit configured to receive the information of the job transmitted by the second transmission unit, a display unit configured to display the information of the job received by the second reception unit, a selection unit configured to select a job to be executed by the job processing apparatus via a plurality of information pieces of jobs displayed by the display unit, and an instruction unit configured to instruct, in response to that a user is authenticated by the authentication unit, the job processing apparatus to execute the job selected by the selection unit in association with identification information of the user, and wherein the job processing apparatus further includes an execution unit configured to execute the job which is instructed to be executed by the instruction unit and associated with the identification information of the user authenticated by the authentication unit in response to that the user is authenticated by the authentication unit.

Further features of the present invention will become apparent from the following description of exemplary embodiments with reference to the attached drawings.

BRIEF DESCRIPTION OF THE DRAWINGS

FIGS. 6A and 6B are schematic diagrams illustrating a data structure of bibliographic information according to the present exemplary embodiment.

FIG. 7 is a schematic diagram illustrating a table according to the present exemplary embodiment.

DESCRIPTION OF THE EMBODIMENTS

Various exemplary embodiments according to the present invention will be described in detail below with reference to the attached drawings. The following exemplary embodiments are not meant to limit the scope of the present invention as encompassed by the appended claims. Further, not all combinations of features described in the present exemplary embodiment are essential for solving means of the present invention.

According to a first exemplary embodiment, a job processing apparatus transmits to a mobile information terminal information of a job which is received from an information processing apparatus and stored in a storage unit. The mobile information terminal displays the information of the job received from the job processing apparatus and selects a job to be executed by the job processing apparatus via a plurality of information pieces of the displayed jobs. Then, the mobile information terminal instructs the job processing apparatus to execute the selected job in association with identification information of the user in response to that the user is authenticated. Subsequently, the job processing apparatus executes the job which is instructed to be executed by the mobile information terminal and associated with the identification information of the authenticated user in response to that the user who logs in the job processing apparatus is authenticated. The details of the processing are described below.

Figure 1:
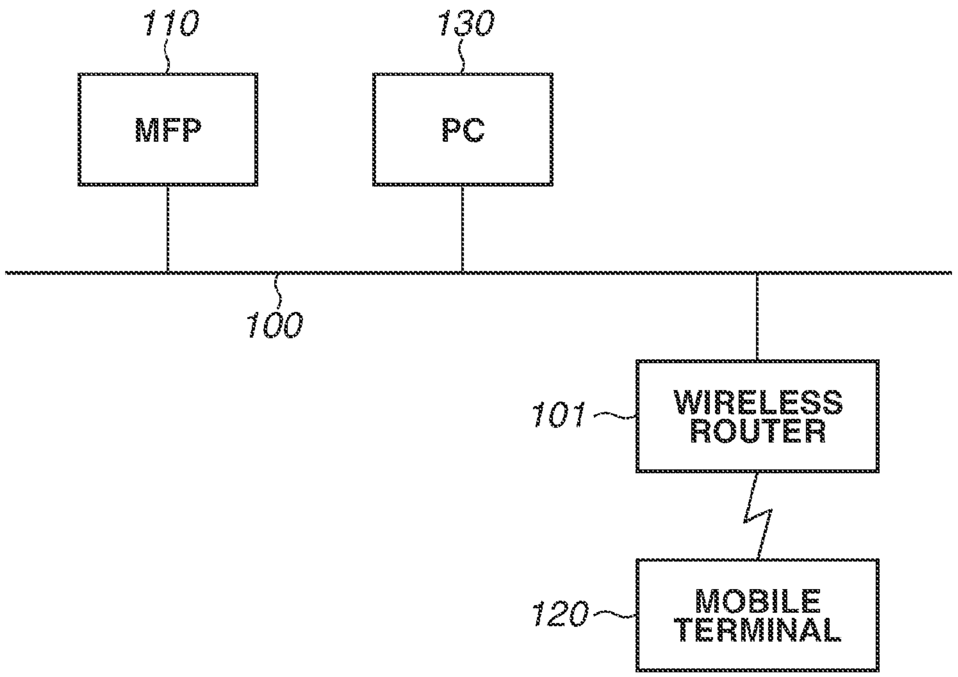
FIG. 1 is a block diagram illustrating a system configuration according to an exemplary embodiment.

An entire configuration of a job processing system according to the first exemplary embodiment of the present invention is described with reference to a block diagram in FIG. 1.

The job processing system includes an MFP 110 which is an example of a job processing apparatus, a personal computer (PC) 130, a wireless router 101, and a mobile terminal 120. The mobile terminal 120 is an external mobile information terminal, such as a PDA, a tablet, and a smartphone. The PC 130, the MFP 110, and the wireless router 101 are connected to each other via a network 100. Thus, the PC 130 and the MFP 110 can communicate with each other and transmit and receive data therebetween. The mobile terminal 120 is connected to the network 100 via the wireless router 101. Thus, the mobile terminal 120 and the MFP 110 can transmit and receive data therebetween. The network 100 may be a local area network (LAN) and a wide area network (WAN), such as the Internet. The configuration in which the single PC 130 is connected to the MFP 110 via the network 100 is illustrated in FIG. 1 as an example, however, the present invention is not limited to this configuration. A configuration may be adopted in which a plurality of the PCs 130 is connected to the MFP 110 via the network 100.

The MFP 110 includes a scanner unit as an image input device and a printer unit as an image output device. The scanner unit includes an automatic document feeding unit and an image reading unit which are described below with reference to FIG. 3. The automatic document feeding unit conveys a document placed on a document tray. The image reading unit reads an image of the document using an optical sensor, such as a charge coupled device (CCD) sensor. The image reading unit transfers image data generated by reading the image of the document to a controller unit of the MFP 110. The controller unit is connected to an external apparatus, such as the PC 130 and an external server, via the network 100 and performs processing, such as reception of a job from the external apparatus. The printer unit prints an image on a sheet based on image data input from the scanner unit, the PC 130, the external server, and the like.

The MFP 110 has a copy function of generating image data by reading a document and printing an image on a sheet based on the generated image data. The MFP 110 also has a PC print function of receiving a print job from the external apparatus, such as the PC 130 and the external server, and printing a character and an image on a sheet based on data instructed to be printed. Printing by the print function may be color printing or monochrome printing.

The PC 130 generates, for example, image data by application software and transmits the generated image data to the MFP 110. Further, the PC 130 generates, for example, page description language (PDL) data using a printer driver. The MFP 110 rasterizes the PDL data transmitted from the PC 130 via the network 100 and generates bitmap data.

A user instructs the PC 130 a print setting (for example, the number of copies, a color setting, a finishing setting, and the like) via the printer driver. Subsequently, the PC 130 transmits the print data to which the instruction of the print setting is received from the user to the MFP 110. The MFP 110 temporarily stores the received print data or executes the print processing based on the received print data. The MFP 110 also executes the print processing based on the temporarily stored print data in response to an instruction from the mobile terminal 120.

Figure 2:
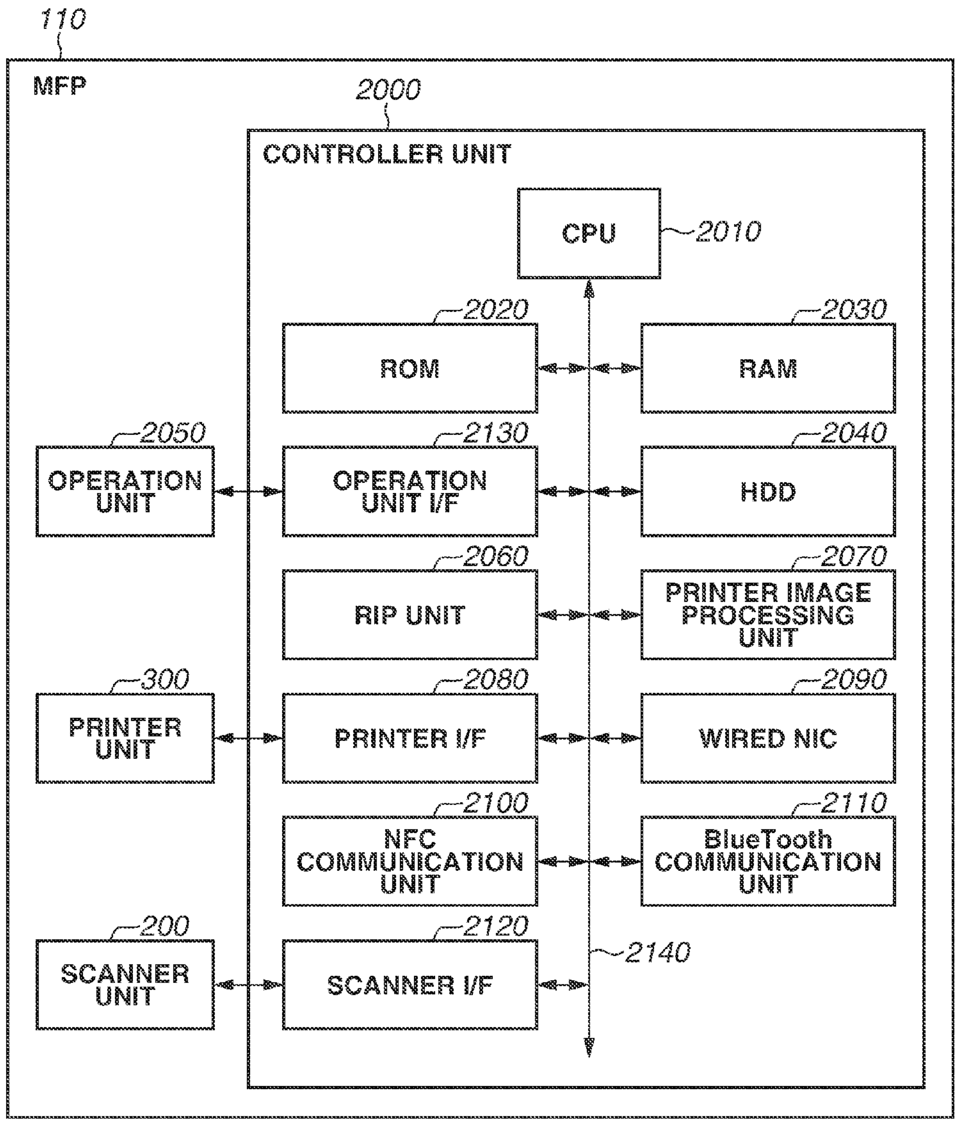
FIG. 2 is a block diagram illustrating a hardware configuration of a multi-function peripheral (MFP) according to the present exemplary embodiment.

A hardware configuration of the MFP 110 according to the first exemplary embodiment is described with reference to a block diagram in FIG. 2.

A controller unit 2000 includes a central processing unit (CPU) 2010, a read-only memory (ROM) 2020, a random access memory (RAM) 2030, a HDD 2040, a raster image processor (RIP) unit 2060, and a printer image processing unit 2070. The controller unit 2000 further includes a printer interface (I/F) 2080, a scanner I/F 2120, and an operation unit I/F 2130. The controller unit 2000 further includes a wired network interface controller (NIC) 2090, a near field communication (NFC) communication unit 2100, and a Bluetooth® communication unit 2110. These modules are connected to each other via a system bus 2140 or a hub and can transmit and receive data therebetween.

The CPU 2010 comprehensively controls the MFP 110 based on a control program and the like stored in the ROM 2020 and the HDD 2040. The CPU 2010 reads the control program stored in the ROM 2020 and the HDD 2040, develops the program in the RAM 2030, and executes various types of control processing. For example, the CPU 2010 executes various types of the control processing, such as control of reading by the scanner unit 200, control of printing by the printer unit 300, and control of updating of firmware.

The HDD 2040 mainly stores information (system software) necessary for starting and operating the computer and image data. The HDD 2040 also stores software modules executed by the CPU 2010 which are described below with reference to FIG. 5.

The HDD 2040 stores various control programs necessary for executing various types of processing in flowcharts executed by the CPU 2010 which are described below with reference to FIGS. 8, 9, 10, 12, and 13. The HDD 2040 further stores a display control program for displaying various screens on a display panel of the operation unit 2050, a program for executing rasterization, and the like. The CPU 2010 reads a program stored in the HDD 2040, develops the program in the RAM 2030, and thus executes various operations according to the present exemplary embodiment.

Figure 5:
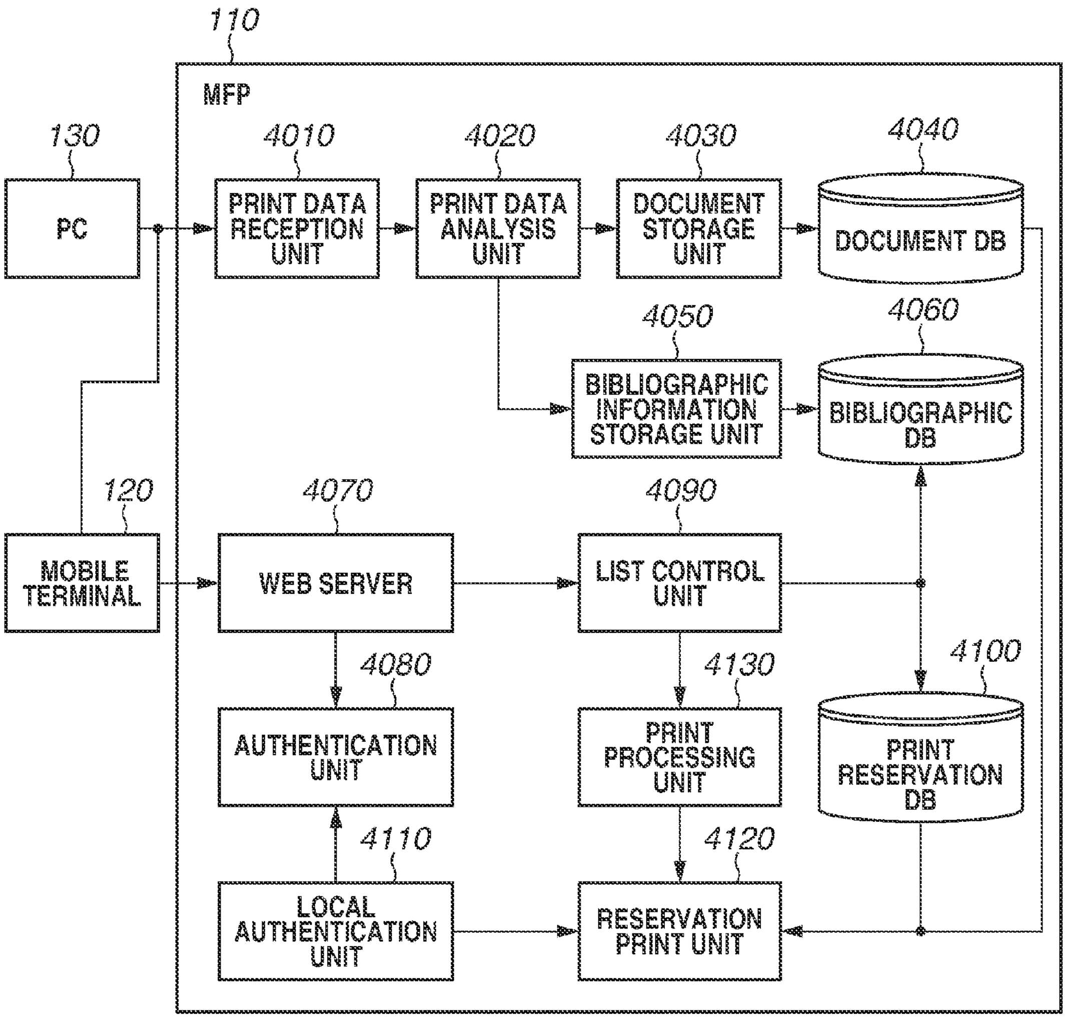
FIG. 5 is a block diagram illustrating a configuration of software modules of the MFP according to the present exemplary embodiment.

The HDD 2040 stores, for example, databases (DB) (a document DB, a bibliographic DB, and a print reservation DB) described below with reference to FIG. 5. The HDD 2040 also stores a print job received from the external apparatus, such as the PC 130 and the external server. Hereinbelow, to store a print job received from the external apparatus, such as the PC 130 and the external server in the HDD 2040 is expressed to retain a print job in the HDD 2040.

The RAM 2030 is a readable and writable memory. The RAM 2030 is also a system work memory necessary for the CPU 2010 to operate. Further, the RAM 2030 is used as a temporary storage area of image data input from the scanner unit 200, the PC 130, the external server, and the like. The RAM 2030 is also used as a storage area for temporarily storing setting information of a job received from a user via the operation unit 2050.

The ROM 2020 is a read only memory. The ROM 2020 is also a boot ROM. The ROM 2020 stores a boot program of the system in advance. The ROM 2020 also stores management data specific to the MFP 110 in advance. The software modules executed by the CPU 2010 which are described below with reference to FIG. 5 may be stored in the ROM 2020 instead of the HDD 2040. The various control programs necessary for executing various types of processing in flowcharts executed by the CPU 2010 which are described below with reference to FIGS. 8, 9, 10, 12, and 13 may be stored in the ROM 2020 instead of the HDD 2040. Further, the display control program for displaying various screens on the display panel of the operation unit 2050, the program for executing rasterization, and the like may be stored in the ROM 2020 instead of the HDD 2040. In this case, the CPU 2010 reads a program stored in the ROM 2020, develops the program in the RAM 2030, and thus executes various operations according to the present exemplary embodiment. Further, the databases (DB) (the document DB, the bibliographic DB, and the print reservation DB) described below with reference to FIG. 5 may be stored in the ROM 2020 instead of the HDD 2040.

The operation unit 2050 includes the display panel (a touch panel) having a touch panel function and hardware keys. On the display panel, a user interface (UI) screen generated by the CPU 2010 is read from the RAM 2030, and thus the UI screen is displayed. A user uses the touch panel, the hardware keys, and the like to perform various settings and inputs. The CPU 2010 receives the various settings and inputs from the user via the touch panel, the hardware keys, and the like. The touch panel notifies the CPU 2010 of information of a touched coordinate.

The operation unit I/F 2130 is an interface for connecting the operation unit 2050 and the controller unit 2000. The operation unit I/F 2130 outputs image data to be displayed on the display panel to the operation unit 2050. The operation unit I/F 2130 transmits information input by a user via the operation unit 2050 to the CPU 2010.

The scanner I/F 2120 is an interface for connecting the scanner unit 200 and the controller unit 2000. The scanner I/F 2120 outputs image data obtained by the image reading unit of the scanner unit 200 from the scanner unit 200 to the controller unit 2000.

The printer I/F 2080 is an interface for connecting the printer unit 300 and the controller unit 2000. The printer I/F 2080 transfers image data to be printed by the printer unit 300 from the controller unit 2000 to the printer unit 300.

The CPU 2010 performs data communication between the PC 130 via the wired NIC 2090. The wired NIC 2090 transmits, for example, image data, various information pieces (such as setting information of a job received from a user via the operation unit 2050), and the like to the PC 130, the external server, and the like. Further, the wired NIC 2090 receives, for example, updated firmware, various information pieces, and the like from the PC 130, the external server, and the like. The CPU 2010 performs data communication between the mobile terminal 120 via the NFC communication unit 2100. The NFC communication unit 2100 can also perform data communication between an NFC card. Further, the CPU 2010 can perform data communication between the mobile terminal 120 via the Bluetooth® communication unit 2110.

The RIP unit 2060 rasterizes PDL data transmitted via the network 100 and generates bitmap data (an image file).

The printer image processing unit 2070 performs resolution conversion processing and correction processing appropriate for a printer engine of the printer unit 300 on the image file generated by the RIP unit 2060. Data pieces of a bitmap image, a print processing command, and the like are transmitted and received between the printer I/F 2080 and the printer engine. The printer engine executes print processing based on the transmitted data.

Operations of the scanner unit 200 and the printer unit 300 included in the MFP 110 are described with reference to a cross-sectional view in FIG. 3.

First, the operations of the scanner unit 200 are described with reference to the cross-sectional view in FIG. 3.

The scanner unit 200 includes an automatic document feeding unit 450. The automatic document feeding unit 450 includes a document tray 30 for stacking a document 32 thereon and feeds the document 32 stacked on the document tray 30. The scanner unit 200 reads an image of the fed document 32 at a position of a fixed optical system. The operations are specifically described below.

The automatic document feeding unit 450 includes the document tray 30 for stacking a document bundle including one or more sheets of the document 32, a separation pad 21 for regulating the document bundle so as not to stick out from the document tray 30 and advance downstream before start of conveyance of the document 32, and a feeding roller 1.

The feeding roller 1 is placed on a document surface of the document bundle stacked on the document tray and rotated. Accordingly, the document 32 on an uppermost surface of the document bundle is fed. A plurality of sheets of the document 32 fed by the feeding roller 1 is separated one by one by an action of a separation roller 2 and the separation pad 21 and fed. The separation is realized by a known retard separation technique.

The document 32 separated by the separation roller 2 and the separation pad 21 is conveyed by a pair of conveyance rollers 3 to a registration roller 4. Further, the conveyed document 32 abuts on the registration roller 4. Accordingly, skew feeding of the document 32 in the conveyance is resolved. On the downstream side of the registration roller 4, a feeding path is arranged to convey the document 32 passing through the registration roller 4 to a direction of a document flow reading glass 201.

The document 32 conveyed to the feeding path is conveyed onto a platen by a large roller 7 and a feeding roller

5. The large roller 7 is in contact with the document flow reading glass 201. The scanner unit 200 reads an image on a front surface of the document 32 passing through the document flow reading glass 201. The document 32 fed by the large roller 7 passes through a conveyance roller 6 and moves between a roller 16 and a discharge diverter. Then, the document 32 is discharged to a document discharge tray 31 via the discharge diverter and a discharge roller 8.

The scanner unit 200 can read an image on a back surface of the document 32 by reversing the document 32. More specifically, the discharge roller 8 is reversed in a state in which the document 32 is pinched by the discharge roller 8 and the discharge diverter is switched, so that the document 32 is moved to a reversing path 19. The moved the document 32 abuts on the registration roller 4 from the reversing path 19, and thus, the skew feeding of the document 32 in the conveyance is resolved again. Then, the document 32 is moved again to the document flow reading glass 201 by the feeding roller 5 and the large roller 7. The scanner unit 200 reads an image on the back surface of the document 32 passing through the document flow reading glass 201.

Figure 3:
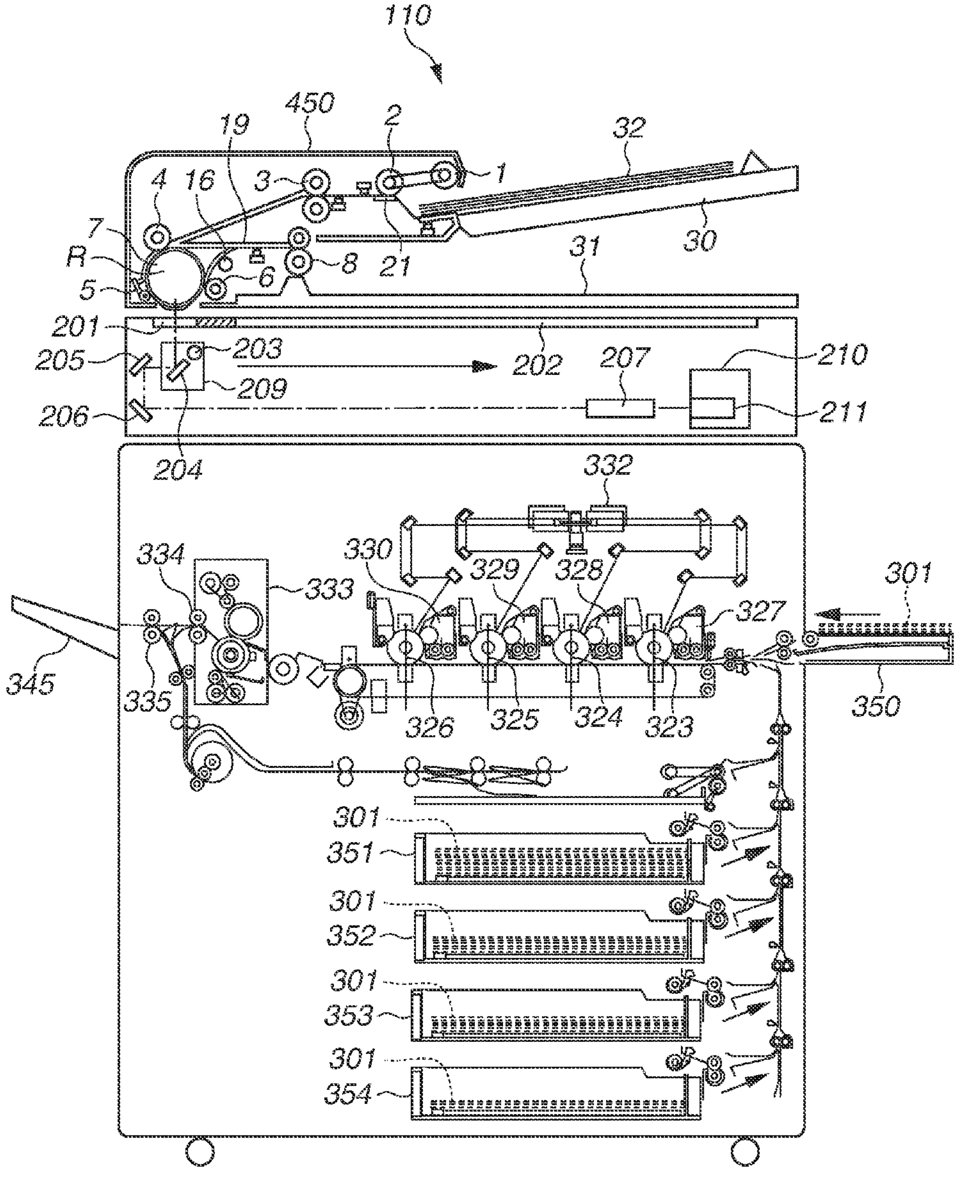
FIG. 3 is a cross-sectional view of the configuration of the MFP according to the present exemplary embodiment.

On the other hand, when a document placed on a document positioning glass plate 202 by a user is read, the scanner unit 200 causes an optical scanner unit 209 to scan the document placed on the document positioning glass plate 202 in a sub-scanning direction indicated by an arrow in FIG. 3. Accordingly, the scanner unit 200 optically reads image information recorded on the document.

The document 32 on the document tray 30 or on the document positioning glass plate 202 is read by a following optical system. The optical system includes the document flow reading glass 201, the document positioning glass plate 202, the optical scanner unit 209 including an optical lamp 203 and a mirror 204, mirrors 205 and 206, a lens 207, and a CCD sensor unit 210. According to the present exemplary embodiment, the CCD sensor unit 210 includes a CCD 211 (a CCD (a three line sensor unit) for reading a color image (read-green-blue (RGB)) and a CCD (a one line sensor unit) for reading a monochrome image).

The image information read by the optical system is photoelectrically converted and input to the controller unit 2000 as image data. According to the present exemplary embodiment, the case is described in which the optical system included in the scanner unit 200 is a reduction optical system in which reflected light from the document 32 forms an image on the CCD sensor, however, the optical system is not limited to the reduction optical system. The optical system included in the scanner unit 200 may be an equal magnification optical system in which reflected light from the document 32 forms an image on a contact image sensor (CIS). According to the present exemplary embodiment, the case is described in which the MFP 110 includes the scanner unit 200, however, the MFP 110 including the scanner unit 200 is not an essential configuration of the present invention.

The operations of the printer unit 300 are described with reference to the cross-sectional view in FIG. 3.

The printer unit 300 performs operations (print operations) for outputting an image to a sheet 301 based on image data transferred to the printer unit 300. The operations are specifically described below.

The image data transferred to the printer unit 300 is converted to a laser beam corresponding to the image data by a laser unit 332. The laser beam is emitted to photosensitive drums (323 to 326), and electrostatic latent images corresponding to the image data are formed on the photosensitive drums (323 to 326). The electrostatic latent images formed on the photosensitive drums (323 to 326) are developed by developing units (327 to 330) using toners (developing agents) to be visualized as toner images. In the case of a color machine, four photosensitive drums (323 to 326) and four developing units (327 to 330) are included for cyan, yellow, magenta, and black colors.

The printer unit 300 includes cassettes (351 to 354) and a manual feeding tray 350 as sheet storage units (also referred to as sheet feed stages). The cassettes (351 to 354) can store a plurality of sheets 301 (for example, 600 sheets). On the other hand, the manual feeding tray 350 can store a plurality of sheets 301 (for example, 100 sheets). The printer unit 300 transfers the toner images developed and visualized by the toner to the sheet 301 fed from any of the cassettes (351 to 354) and the manual feeding tray 350. Then, the sheet 301 on which the toner is transferred is conveyed to a fixing unit 333. The toner is fixed to the sheet 301 by heat and pressure. The sheet 301 passing through the fixing unit 333 is discharged by conveyance rollers 334 and 335 to a discharge tray 345 (a discharge unit) included in the MFP 110.

The MFP 110 is described as the color machine including the four photosensitive drums (323 to 326) and the four developing units (327 to 330) each, however, the MFP 110 is not limited to the color machine. If the MFP 110 is a monochrome machine including one each of the photosensitive drum 326 and the developing unit 330, embodiments can be similarly applied thereto.

An electrophotographic method is described as a method for printing an image on the sheet 301, however, the printing method is not limited to the electrophotographic method. As long as an image can be printed on the sheet 301, for example, an ink-jet method and other method may be used as the method for printing an image on the sheet 301, and embodiments can be also similarly applied to other methods (for example, a thermal transfer method and the like).

Figure 4:
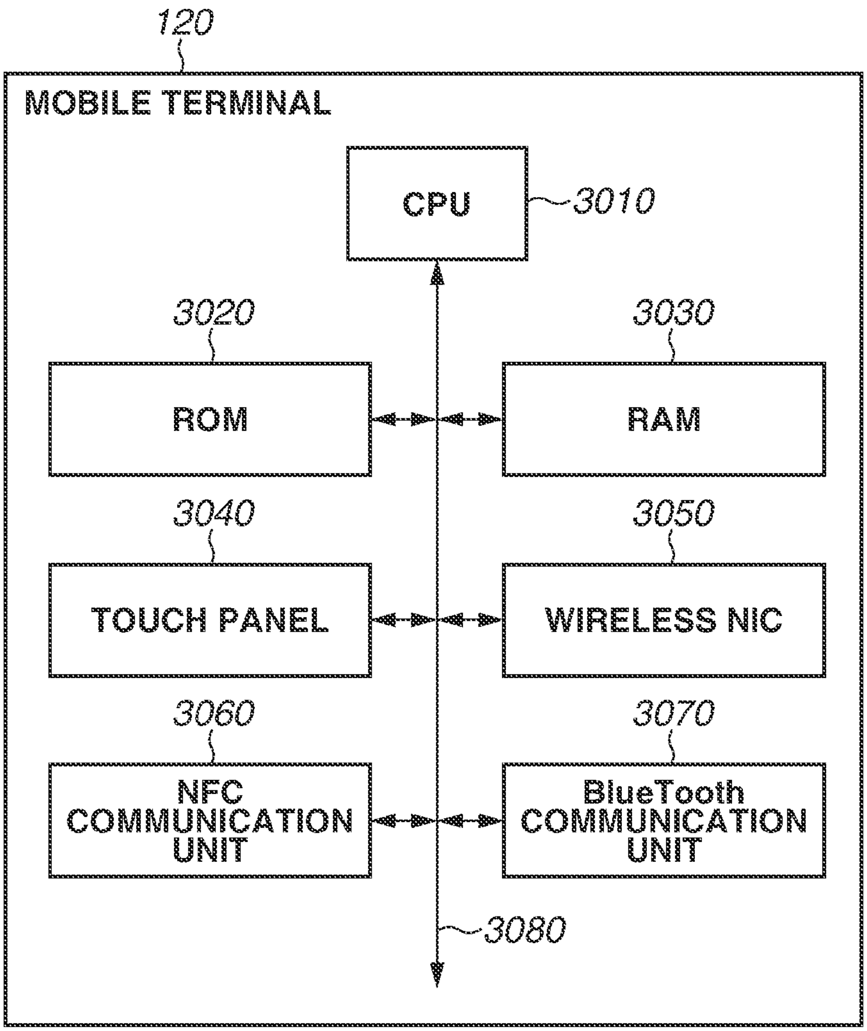
FIG. 4 is a block diagram illustrating a hardware configuration of a mobile terminal according to the present exemplary embodiment.

A hardware configuration of the mobile terminal 120 according to the first exemplary embodiment is described with reference to a block diagram in FIG. 4.

The mobile terminal 120 includes a CPU 3010, a ROM 3020, a RAM 3030, and a touch panel 3040. The mobile terminal 120 further includes a wireless NIC 3050, a NFC communication unit 3060, and a Bluetooth® communication unit 3070. These modules are connected to each other via a system bus 3080 or a hub and can transmit and receive data therebetween.

The CPU 3010 develops various programs stored in the ROM 3020 in the RAM 3030 and executes the developed program. Accordingly, the CPU 3010 comprehensively controls each module and operates the mobile terminal 120.

The ROM 3020 stores a program for controlling operations of the mobile terminal 120. The program includes an authentication program utilizing a proximity communication unit, such as a Web browser and NFC.

The RAM 3030 functions as a work memory in which a program stored in the ROM 3020 is developed or data is temporarily stored.

A UI screen generated by the CPU 3010 is read from the RAM 3030, and thus the touch panel 3040 displays the UI screen thereon. The touch panel 3040 notifies the CPU 3010 of information of a touched coordinate.

The CPU 3010 performs data communication between the MFP 110 via the wireless NIC 3050. The CPU 3010 can also perform data communication between the MFP 110 via the NFC communication unit 3060. Further, the CPU 3010 can perform data communication between the MFP 110 via the Bluetooth® communication unit 3070.

A configuration of software modules of the MFP 110 according to the first exemplary embodiment is described with reference to a block diagram in FIG. 5.

The MFP 110 includes a control unit for each function as a software module. The software module is stored in the HDD 2040 or the ROM 2020. The control unit includes, for example, a print data reception unit 4010, a print data analysis unit 4020, a document storage unit 4030, a bibliographic information storage unit 4050, an authentication unit 4080, a list control unit 4090, a local authentication unit 4110, a reservation print unit 4120, and a print processing unit 4130. These control units can be realized when the CPU 2010 executes a program stored in the HDD 2040 or the ROM 2020.

The MFP 110 further includes a document DB 4040, a bibliographic DB 4060, and a print reservation DB 4100 as databases. These databases are stored in the HDD 2040 or the ROM 2020. The MFP 110 further includes a web server 4070.

The print data reception unit 4010 receives print data transmitted from the PC 130 by controlling the wired NIC 2090. The print data reception unit 4010 may receive print data transmitted from the mobile terminal 120 by controlling the NFC communication unit 2100 and the Bluetooth® communication unit 2110. The print data received by the print data reception unit 4010 is temporarily stored in the RAM 2030.

The print data analysis unit 4020 performs interpretation processing of the print data received by the print data reception unit 4010. The print data analysis unit 4020 extracts a print job name, user identification information (for example, a job owner name), and print processing parameters (for example, the number of copies, a color setting, a finishing setting, and the like) included in the print data.

The document storage unit 4030 stores the print data received by the print data reception unit 4010 in the document DB 4040 as the database. The document storage unit 4030 issues an identifier (DocumentID) indicating the stored print data every time the print data is stored therein. A user can extract information stored in the document DB 4040 by specifying an arbitrary search condition.

The bibliographic information storage unit 4050 stores a pair of the information extracted by the print data analysis unit 4020 and the identifier issued by the document storage unit 4030 in the bibliographic DB 4060 as the database. A user can extract information stored in the bibliographic DB 4060 by specifying an arbitrary search condition.

An example of a data structure stored in the bibliographic DB 4060 is described with reference to a schematic diagram in FIG. 6A. The bibliographic DB 4060 is configured in a tree structure including a user name as a root and bibliographic information as a leaf. The document storage unit 4030 handles the user identification information (for example, the job owner name) extracted by the print data analysis unit 4020 as a user name in the bibliographic DB 4060 and registers the bibliographic information in an appropriate node.

An example of the bibliographic information stored by the bibliographic information storage unit 4050 is described with reference to a schematic diagram in FIG. 6B. As illustrated in FIG. 6B, the bibliographic information stored by the bibliographic information storage unit 4050 is described in an Extensible Markup Language (XML) format. An element 611 indicates print attributes which is obtained by extracting information pieces necessary for the bibliographic information (for example, the print job name, the job owner name, the number of print copies, the color setting, and the like) from the print data received from the PC 130 and the mobile terminal 120. An element 612 indicates a status of the print data indicated by the bibliographic information (for example, a flag indicating that printing has been executed, a flag indicating that printing is not executed, and the like). An element 613 indicates print attributes when the print setting is changed by the list control unit 4090.

Based on a request from the mobile terminal 120, the web server 4070 returns an HyperText Markup Language (HTML) document as a reply to the mobile terminal 120 as the request source. The HTML document may include a program of JavaScript® and the like. When authentication is required for the request from the mobile terminal 120, the web server 4070 receives a user name and a password from the mobile terminal 120. The authentication unit 4080 performs authentication processing of the user based on the received user name and password.

The list control unit 4090 generates an HTML document for displaying a UI screen for controlling the print data stored in the document DB 4040 and the bibliographic DB 4060. In addition, the UI screen based on the HTML document generated by the list control unit 4090 is displayed on the touch panel 3040. As types of control that the user can instruct with respect to the print data via the screen, there are three types of control, for example, "start of print processing of the retained print data", "deletion of the retained print data", and "change of print setting with respect to the retained print data".

For example, there is a case that "start of print processing of the retained print data" is instructed by a user, and a release instruction with respect to the print data is instructed to be suspended until the local authentication unit 4110 succeeds in the authentication processing of user information. In such a case, information of the print data is registered in the print reservation DB 4100 together with the information of the user authenticated by the authentication unit 4080. The bibliographic information registered in the print reservation DB 4100 is indicated by a table 700 as illustrated in FIG. 7. Schemas in the table 700 include a user name 701 of a user who instructs "start of print processing of the retained print data" (hereinbelow, referred to as release processing) and a time 702 when the release processing is executed. The schemas of the table 700 further include address information (StoredHost) 703 of the host in which the document is stored and an identifier (DocumentID) 704 indicating the print data to which the release processing is executed. In response to completion of execution of the print processing with respect to the print data registered in the print reservation DB, the information of the print data registered in the print reservation DB (i.e., a record in the table 700) is deleted from the table 700.

For example, when "deletion of the retained print data" is instructed by a user, the print data registered in the document DB 4040 is deleted. Further, for example, when "change of print setting with respect to the retained print data" is instructed by a user, the print setting with respect to the print data registered in the document DB 4040 is changed.

The local authentication unit 4110 performs display of a screen and control for performing the authentication processing of a user who logs in the MFP 110 using the operation unit 2050. The user information (for example, the user name and the password) input by the local authentication unit 4110 is transferred to the authentication unit 4080. The authentication unit 4080 performs the authentication processing of the user using the user information transferred from the local authentication unit 4110.

The reservation print unit 4120 extracts the print data to which the release processing is instructed from the user succeeded in the authentication processing by the authentication unit 4080. The print processing unit 4130 performs the print processing based on the print data extracted by the reservation print unit 4120.

According to the first exemplary embodiment, the job processing apparatus transmits to the mobile information terminal information of a job which is received from the information processing apparatus and stored in the storage unit. The mobile information terminal displays the information of the job received from the job processing apparatus and selects a job to be executed by the job processing apparatus via a plurality of information pieces of the displayed jobs. Then, the mobile information terminal instructs the job processing apparatus to execute the selected job in association with identification information of the user in response to that the user is authenticated. Subsequently, the job processing apparatus executes the job which is instructed to be executed by the mobile information terminal and associated with the identification information of the authenticated user in response to that the user who logs in the job processing apparatus is authenticated.

According to the first exemplary embodiment, a user can select a job to be executed from among a plurality of jobs stored in the job processing apparatus using the mobile information terminal and instruct execution of the selected job in advance, and thus the job can be executed in response to that the user logs in the job processing apparatus. The details of the processing are described below.

Figure 8:
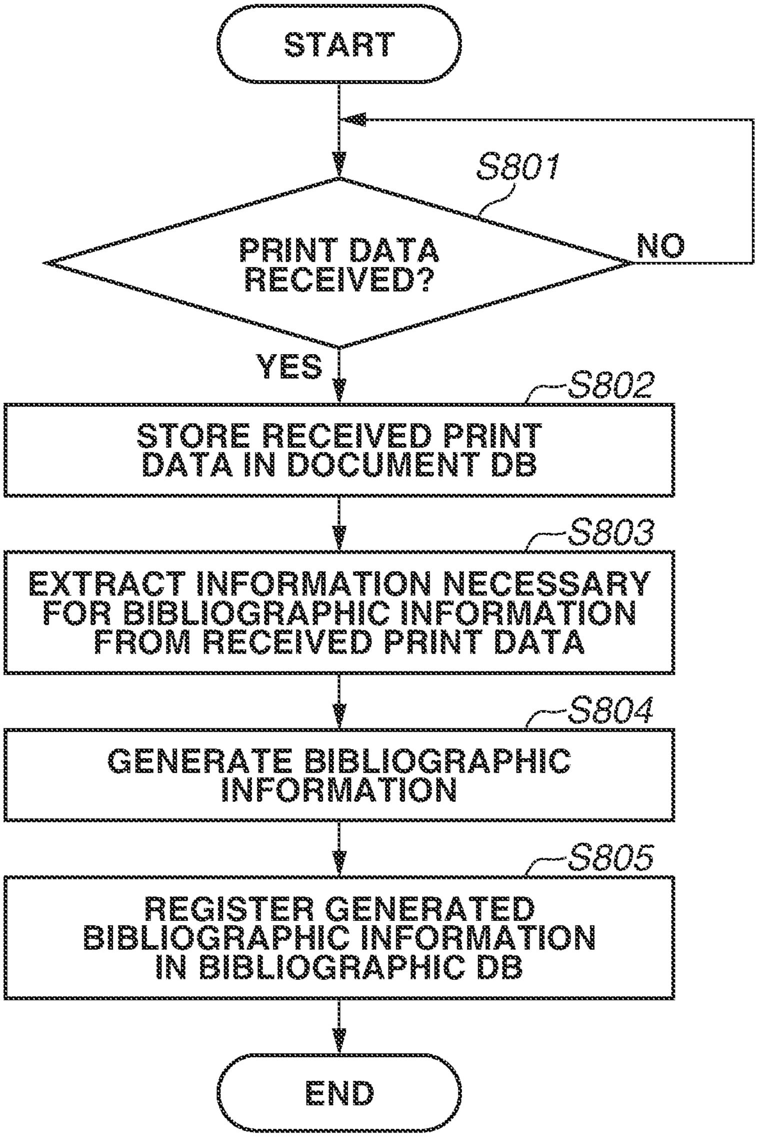
FIG. 8 is a flowchart illustrating an example of control according to a first exemplary embodiment.

A series of processing from when print data is received to when the received print data in the MFP 110 according to the first exemplary embodiment is temporarily retained is described with reference to a flowchart illustrated in FIG. 8. The processing is performed by the CPU 2010 executing the control program read from the ROM 2020 or the HDD 2040 and developed in the RAM 2030.

First, in step S801, the CPU 2010 determines whether print data is received from the PC 130 via the wired NIC 2090. The processing in step S801 is performed using a protocol, such as a line printer daemon protocol (LPR) and an Internet printing protocol (IPP). IPP is a protocol which can notify the MFP 110 of the print job name, the user identification information (for example, the job owner name), and also the print attributes such as the number of print copies and the color setting. In this regard, the print data can also include the print job name, the user identification information (for example, the job owner name), and the print attributes such as the number of print copies and the color setting. When determining that the print data is received (YES in step S801), the CPU 2010 advances the processing to step S802. On the other hand, the CPU 2010 repeats the processing in step S801 until the print data is received.

In step S802, the CPU 2010 stores the print data received in step S801 in the document DB 4040. In this regard, the CPU 2010 issues an identifier for each print data stored in the document DB 4040.

In step S803, the CPU 2010 extracts the information necessary for the bibliographic information from the print data received in step S801. For example, in step S803, the CPU 2010 extracts the print job name, the user identification information (for example, the job owner name), the number of print copies, the color setting, and the like as the information necessary for the bibliographic information. The information necessary for the bibliographic information may be a part of all the print attributes. For example, the information necessary for the bibliographic information may be limited to information necessary for identifying the print data, the print attributes to be displayed on a selection screen of the print data (the screen is generated by the list control unit 4090), and the print attributes in which the print setting with respect to the print data can be changed. In the processing in step S803, the CPU 2010 may extract the information necessary for the bibliographic information not from the print data received in step S801 but from the protocol such as LPR and IPP.

In step S804, the CPU 2010 generates the bibliographic information in the XML format indicated in FIGS. 6A and 6B based on the identifier issued in the storage processing in step S802 and the information extracted in step S803. The processing in step S804 is performed via the print data analysis unit 4020. In step S805, the CPU 2010 registers the bibliographic information generated in step S804 in the bibliographic DB 4060.

The series of processing from when the print data is received to when the received print data is temporarily retained in the MFP 110 according to the first exemplary embodiment is described in detail above.

Next, a series of processing from when a control instruction with respect to the temporarily retained print data is received to when the instructed control is executed in the MFP 110 according to the first exemplary embodiment is described with reference to a flowchart illustrated in FIG. 9. The processing is performed by the CPU 2010 executing the control program read from the ROM 2020 or the HDD 2040 and developed in the RAM 2030.

First, in step S901, the CPU 2010 determines whether a screen request for controlling the print data is received. When a web browser executed in the mobile terminal 120 accesses a predetermined uniform resource locator (URL), the CPU 2010 receives the screen request for controlling the print data registered in the document DB 4040. The processing for receiving the screen request for controlling the print data registered in the document DB 4040 is performed via the web server 4070. When determining that the screen request for controlling the print data is received (YES in step S901), the CPU 2010 advances the processing to step S1000. On the other hand, the CPU 2010 repeats the processing in step S901 until the screen request for controlling the print data is received.

In step S1000, the CPU 2010 executes first authentication processing via the authentication unit 4080. The processing in step S1000 is described with reference to a flowchart illustrated in FIG. 10.

First, in step S1001, the CPU 2010 displays an authentication screen for receiving inputs of the user name and the password on the touch panel 3040. The processing in step S1001 is performed as described below. Specifically, the web server 4070 refers to a header of HyperText Transfer Protocol (HTTP) request information transferred from the mobile terminal 120. When authentication information is not included therein, the CPU 2010 returns an HTTP response code 401. The web browser executed in the mobile terminal 120 receiving the HTTP response code 401 displays a screen for inputting the user name and the password on the touch panel 3040.

In step S1002, the CPU 2010 receives inputs of the user name and the password from the user via the authentication screen displayed on the touch panel 3040. The web browser receives the inputs of the user name and the password.

In step S1003, the CPU 2010 performs the authentication processing via the user name and the password input by the user. The authentication processing is performed by the web server 4070 performing digest authentication. The web browser executed in the mobile terminal 120 adds the user name and the password to the HTTP request header and makes the request again. In this regard, the password may be hashed. The web server 4070 notifies the authentication unit 4080 of the user information and the password included in the HTTP request header. The authentication unit 4080 performs the authentication processing using the user name and the password notified from the web server 4070.

In step S1004, the CPU 2010 determines whether the user authentication is successful as a result of the authentication processing. When determining that the user authentication is successful (YES in step S1004), the CPU 2010 advances the processing to step S1005. On the other hand, when determining that the user authentication fails (NO in step S1004), the CPU 2010 advances the processing to step S1007. In step S1007, the CPU 2010 notifies the user of failure of the authentication. The failure of the authentication may be notified by displaying a message on the touch panel 3040. In addition, the failure of the authentication may be notified by sound and light. After the processing in step S1007, the processing returns to step S1002.

In step S1005, the CPU 2010 generates user information which is referred to as a login context and valid in the communication. The processing in step S1005 is performed via the web server 4070. The login context includes information of the user who succeeded in the authentication (for example, a user identification (ID), a user name, and the like). The login context generated in step S1005 is stored until a logout request is received which is described below in step S903 in FIG. 9.

In step S1006, the CPU 2010 adds the login context generated in step S1005 to session information generated when the web server 4070 performs the authentication processing. Accordingly, when the control instruction to the print data is received, the list control unit 4090 can determine the information of the user who requests the control of the print data from the login context. After the processing in step S1006, the processing proceeds to step S902 in FIG. 9.

In step S902, the CPU 2010 generates an HTML document for displaying a screen for receiving the control instruction to the print data stored in the document DB 4040 from the user on the touch panel 3040. In this regard, the HTML document is generated based on the information of the user authenticated by the processing in step S1000 (for example, the user ID, the user name, and the like) and the bibliographic information stored in the bibliographic DB 4060. The processing in step S902 is performed via the list control unit 4090. The web browser of the mobile terminal 120 displays the screen for receiving the control instruction to the print data on the touch panel 3040 based on the HTML document generated in step S902. Examples of the screens for receiving the control instruction to the print data displayed on the touch panel 3040 are described with reference to schematic diagrams in FIGS. 11A to 11D.

Figure 11A:
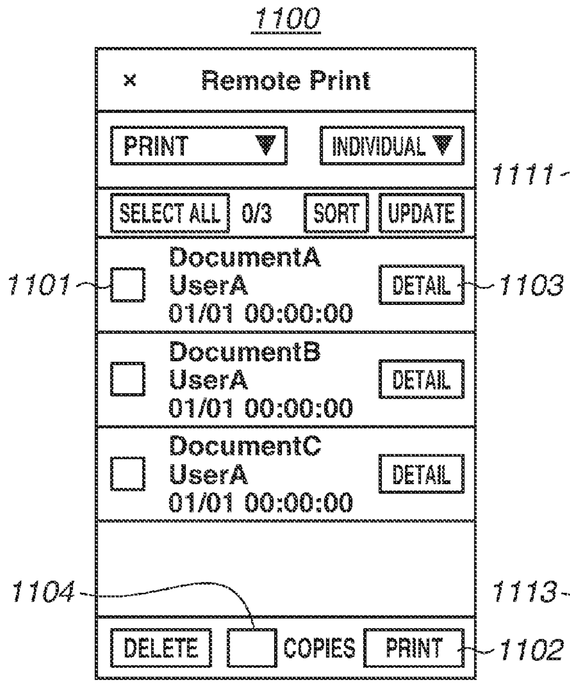
FIGS. 11A to 11D illustrate configurations of screens according to the first exemplary embodiment.
Figure 11B:
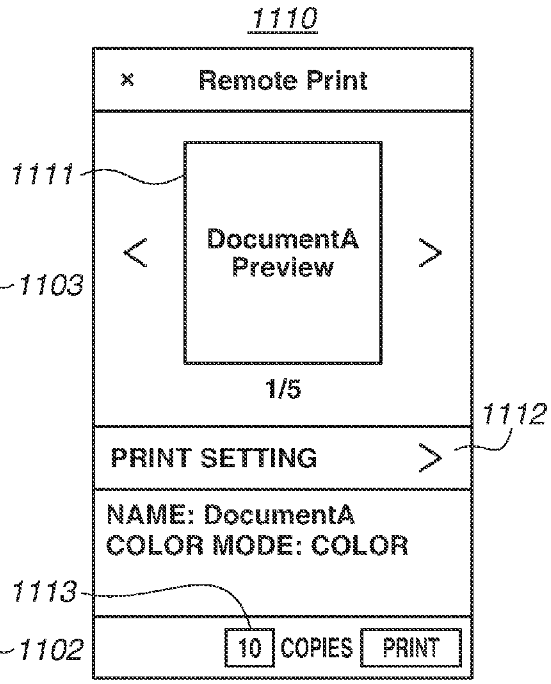
Figure 11C:
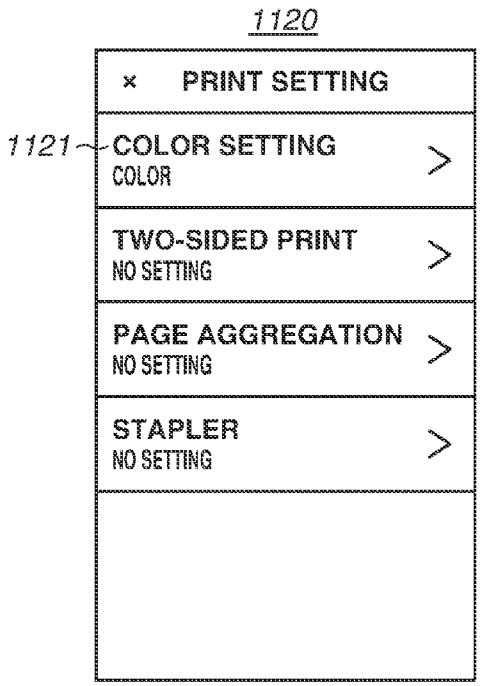
Figure 11D:
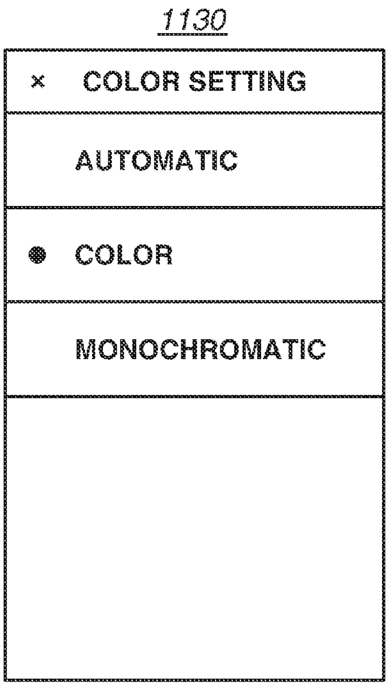

FIG. 11A illustrates a selection screen 1100 for selecting print data. A check box 1101 is used for selecting desired print data from among a plurality of retained print data pieces. Via the check box 1101, the user can select not only one print data but also two or more print data pieces at the same time. A print button 1102 is used for requesting the release processing with respect to the print data which is checked via the check box 1101 (i.e., the print data selected from among the plurality of print data pieces). A detail button 1103 is used for calling a detail screen 1110 for displaying detail information of the retained print data. The detail screen 1110 includes a preview image 1111 of the print data, a change button 1112 for changing the print attributes of the print data, and the like as illustrated in FIG. 11B. When a user presses the change button 1112, a setting change screen 1120 for changing the print setting is displayed on the touch panel 3040 as illustrated in FIG. 11C. The setting change screen 1120 includes buttons provided for respective print settings which can be changed (for example, the color setting, two-sided print, page aggregation, stapling, and the like). For example, when a user presses a color setting button 1121, a color setting change screen 1130 is displayed on the touch panel 3040 as illustrated in FIG. 11D. Thus, the user can select a desired color setting from "automatic", "color", and "monochromatic" via the color setting change screen 1130. In the example in FIG. 11D, "color" is selected as the color setting. A user can arbitrary specify the number of copies to print the print data checked in the check box 1101 via an input form 1104 of the selection screen 1100 or an input form 1113 of the detail screen 1110.

Figure 9:
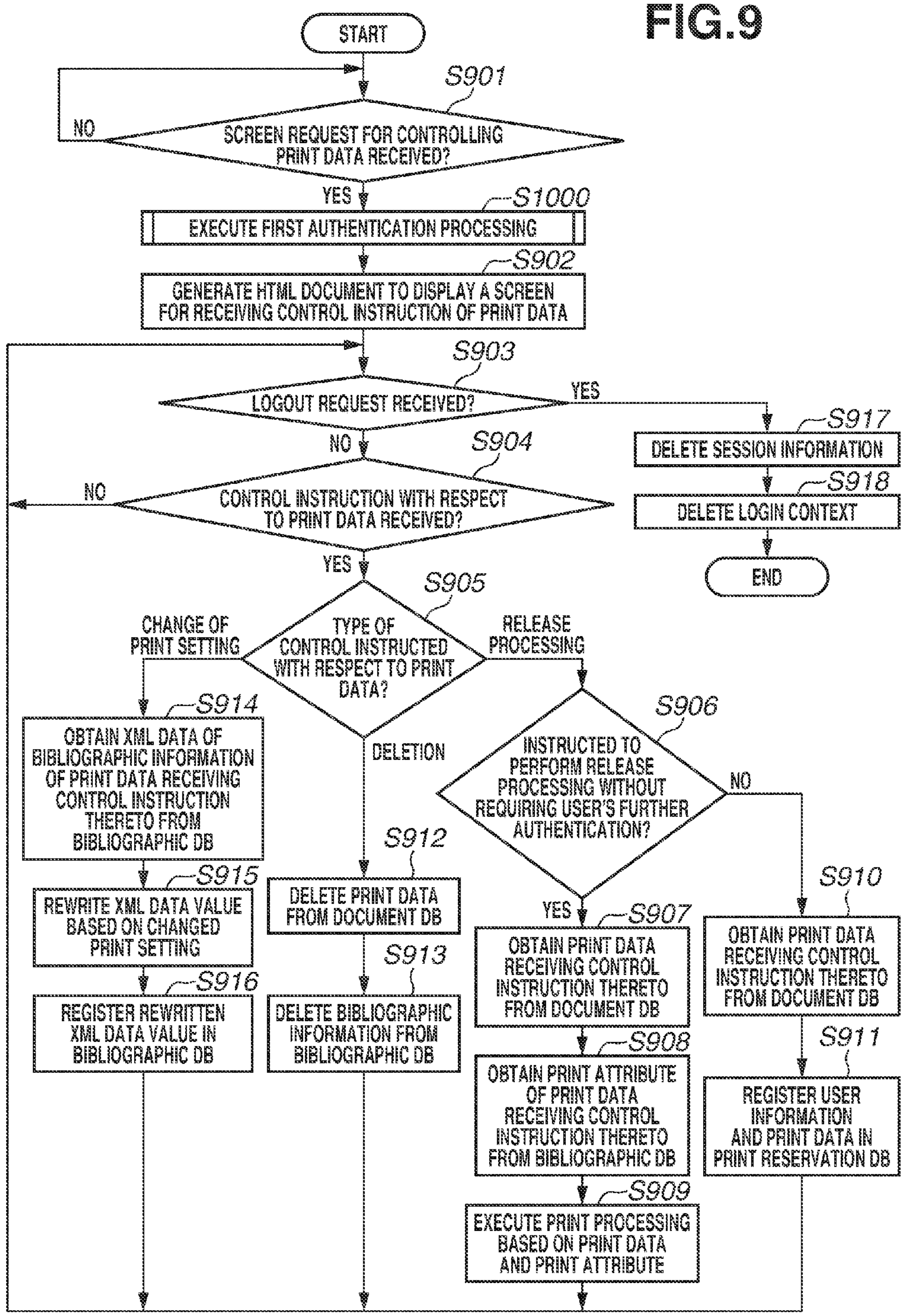
FIG. 9 is a flowchart illustrating an example of control according to the first exemplary embodiment.
Figure 10:
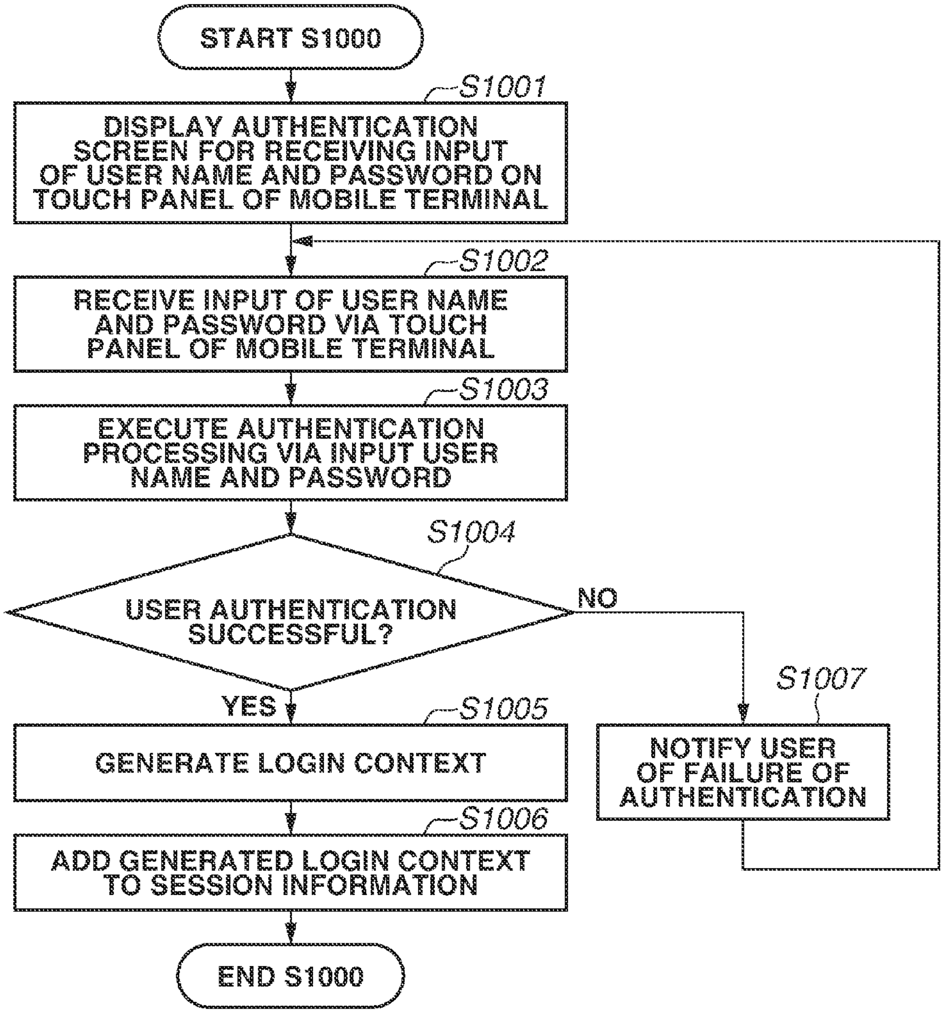
FIG. 10 is a flowchart illustrating an example of control according to the first exemplary embodiment.

The description is returned to the flowchart in FIG. 9. In step S903, the CPU 2010 determines whether a logout request is received. For example, when a user presses a logout key displayed on the touch panel 3040, the CPU 2010 determines that the logout request is received. The CPU 2010 may determine that the logout request is received according to elapse of a predetermined time from when the user authentication is successful (i.e., from when the user logged in) in step S1004 in FIG. 10. When determining that the logout request is received (YES in step S903), the CPU 2010 advances the processing to step S917. In step S917, the CPU 2010 deletes the session information to which the login context generated in step S1005 in FIG. 10 is added. In step S918, the CPU 2010 deletes the login context generated in step S1005. After the processing in step S918, the CPU 2010 terminates the series of the processing according to FIG. 9.

On the other hand, in step S903, when determining that the logout request is not received (NO in step S903), the CPU 2010 advances the processing to step S904. In step S904, the CPU 2010 determines whether the control instruction with respect to the print data is received. The control instruction with respect to the print data is received from the user using the screen (see FIGS. 11A to 11D) for receiving the control instruction with respect to the print data displayed on the touch panel 3040 via the web server 4070. The user selects the desired print data from among the plurality of retained print data pieces using the screen. When there is only one retained print data, selection of the print data by the user may be omitted. Further, the user issues an instruction to execute any of the control "start of print processing of the retained print data", "deletion of the retained print data", and "change of print setting with respect to the retained print data" to the selected print data using the screen.

Regarding the control instruction with respect to the print data, for example, an access to the URL including the identifier (DocumentID) indicating the print data and a control content may be regarded as a control instruction. Alternatively, when an HTTP request is made, JavaScript® Object Notation (JSON) data may be added to body information and a plurality of the identifiers (DocumentID) indicating the print data pieces and the control contents may be included in the JSON data. In this case, the web server 4070 transfers the JSON data to the list control unit 4090. Then, the list control unit 4090 performs the interpretation processing of the JSON data.

When determining that the control instruction with respect to the print data is received (YES in step S904), the CPU 2010 advances the processing to step S905. On the other hand, when determining that the control instruction with respect to the print data is not received (NO in step S904), the CPU 2010 returns the processing to step S903.

In step S905, the CPU 2010 determines a type of the control instruction with respect to the print data. When determining as "start of print processing of the retained print data" (i.e., the release processing), the CPU 2010 advances the processing to step S906. On the other hand, when determining as "deletion of the retained print data", the CPU 2010 advances the processing to step S912. On the other hand, when determining as "change of print setting with respect to the retained print data", the CPU 2010 advances the processing to step S914.

First, the processing is described when the type of the control instruction with respect to the print data is "start of print processing of the retained print data" (i.e., the release processing). The processing is performed via the list control unit 4090.

In step S906, the CPU 2010 determines whether the release processing is instructed to be performed without requiring further user authentication. When the CPU 2010 is instructed to execute the print processing with respect to the print data in response to a print instruction from the mobile terminal 120, the CPU 2010 determines "YES" in the processing in step S906 and advances the processing to step S907. On the other hand, when the CPU 2010 is instructed to suspend the release instruction with respect to the print data until the local authentication unit 4110 succeeds in the authentication processing of the user information, the CPU 2010 determines "NO" in the processing in step S906 and advances the processing to step S910. Whether to perform the release processing without requiring further user authentication or not may be set by a device setting and an administrator setting of the MFP 110. In this case, the MFP 110 manages the device setting and the administrator setting regarding whether to perform the release processing without requiring further user authentication by a flag stored in the RAM 2030. The CPU 2010 may perform the determination processing in step S906 by referring to a value of the flag stored in the RAM 2030. Alternatively, a variation may be adopted in which a user who uses the mobile terminal 120 can arbitrarily set whether to perform the release processing without requiring the further user authentication by the mobile terminal 120.

First, the processing when the print processing with respect to the print data is executed in response to the print instruction from the mobile terminal 120 is described.

In step S907, the CPU 2010 refers to the print data stored in the document DB 4040 and obtains the print data instructed to be controlled in step S904 from the document DB 4040. In this regard, in step S907, the CPU 2010 refers to the print data stored in the document DB 4040 using the information necessary for identifying the print data (for example, the print job name, the job owner name, and the like) and searches the document DB 4040 for specific print data.

In step S908, the CPU 2010 refers to the bibliographic information stored in the bibliographic DB 4060 and obtains the print attributes of the print data instructed to be controlled in step S904 from the bibliographic DB 4060. In step S909, the CPU 2010 executes the print processing based on the print data obtained in step S907 and the print attributes obtained in step S908. The processing in step S909 is performed via the print processing unit 4130. After the processing in step S909, the processing returns to step S903. When the CPU 2010 receives the same control instruction with respect to a plurality of the print data pieces in step S904, a variation may be adopted in which a series of processing from steps S907 to S909 is repeated until the processing is completed with respect to all the print data pieces.

Next, the processing when the release instruction with respect to the print data is suspended until the local authentication unit 4110 succeeds in the authentication processing of the user information is described.

In step S910, the CPU 2010 refers to the print data stored in the document DB 4040 and obtains the print data instructed to be controlled in step S904 from the document DB 4040. In step S911, the CPU 2010 registers a combination of the information of the user who succeeded in the authentication by the processing in step S1000 and the print data obtained in step S910 in the print reservation DB 4100 and returns the processing to step S903. When the CPU 2010 receives the same control instruction with respect to a plurality of the print data pieces in step S904, a variation may be adopted in which a series of processing in steps S910 and S911 is repeated until the processing is completed with respect to all the print data pieces. The CPU 2010 can obtain the information of the user who succeeded in the authentication by the processing in step S1000 from the login context added to the session information by the processing in step S1006 in FIG. 10. The release processing with respect to the print data registered in the print reservation DB 4100 in step S911 is described below with reference to FIG. 12.

Next, the processing is described when the type of the control instruction with respect to the print data is "deletion of the retained print data". The processing is performed via the list control unit 4090.

In step S912, the CPU 2010 refers to the print data stored in the document DB 4040 and deletes the print data instructed to be controlled in step S904 from the document DB 4040. When the print data instructed to be deleted is the print data registered in the print reservation DB 4100, the print data may be controlled so as not to be deleted even when the deletion instruction is received from a user. Further, when the print data instructed to be deleted is the print data registered in the print reservation DB 4100, a warning indicating that the print data cannot be deleted may be issued to the user.

In step S913, the CPU 2010 refers to the bibliographic information stored in the bibliographic DB 4060 and deletes the bibliographic information of the print data instructed to be controlled in step S904 from the bibliographic DB 4060. After the processing in step S913, the processing returns to step S903. When the CPU 2010 receives the same control instruction with respect to a plurality of the print data pieces in step S904, a variation may be adopted in which a series of processing in steps S912 and S913 is repeated until the processing is completed with respect to all the print data pieces.

Next, the processing is described when the type of the control instruction with respect to the print data is "change of print setting with respect to the retained print data" The processing is performed via the list control unit 4090 (see the element 613 described above in FIG. 6B).

In step S914, the CPU 2010 refers to the bibliographic information stored in the bibliographic DB 4060 and obtains XML data of the bibliographic information of the print data instructed to be controlled in step S904 from the bibliographic DB 4060. In step S915, the CPU 2010 rewrites a value of the XML data obtained in step S914 based on the print setting specified by the user (i.e., the changed print setting). In step S916, the CPU 2010 registers the XML data rewritten in step S915 in the bibliographic DB 4060. After the processing in step S916, the processing returns to step S903. When the CPU 2010 receives the same control instruction with respect to a plurality of the print data pieces in step S904, a variation may be adopted in which a series of processing from steps S914 to S916 is repeated until the processing is completed with respect to all the print data pieces.

The series of processing from when the control instruction with respect to the temporarily retained print data is received to when the instructed control is executed in the MFP 110 according to the first exemplary embodiment is described in detail above.

Figure 12:
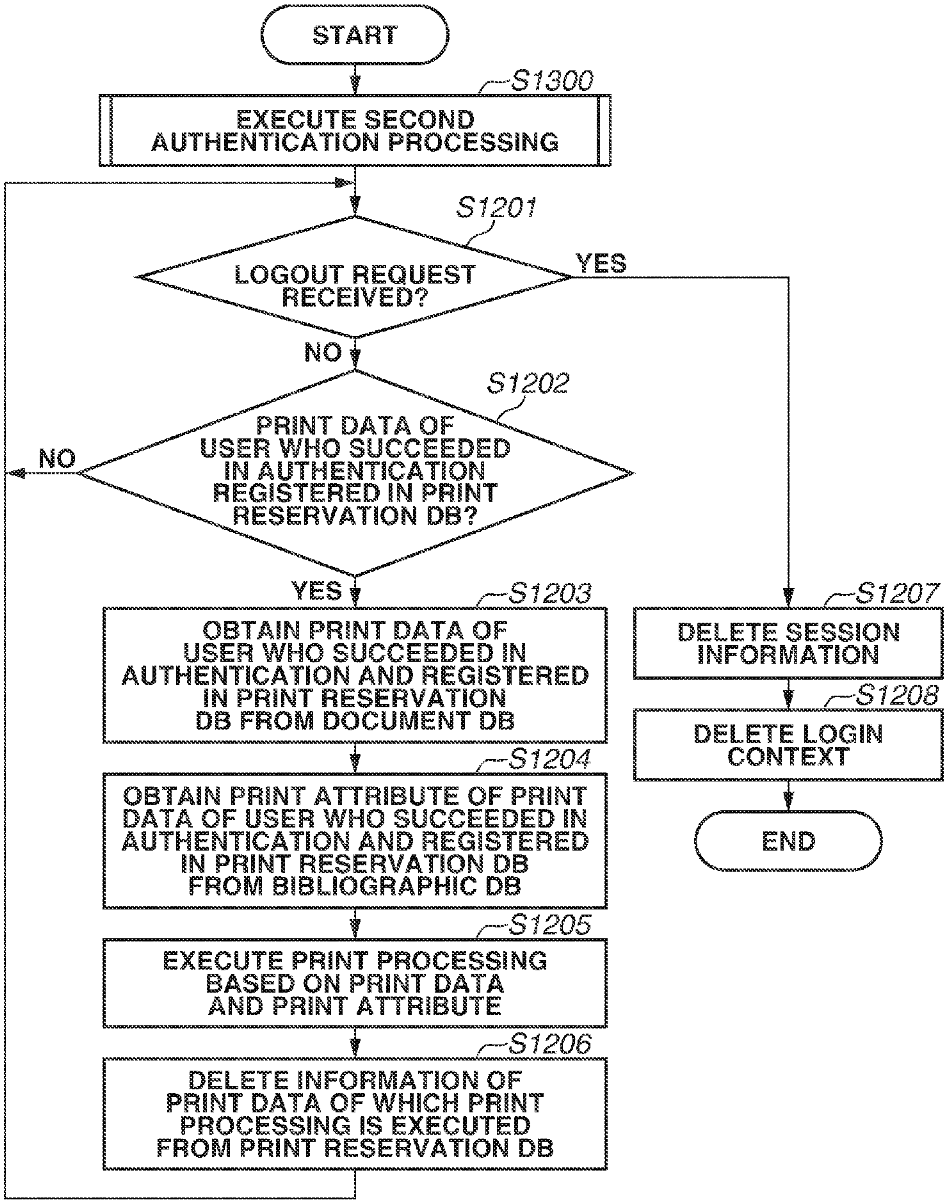
FIG. 12 is a flowchart illustrating an example of control according to the first exemplary embodiment.

Next, a series of processing for performing the print processing with respect to the print data registered in the print reservation DB 4100 in the MFP 110 according to the first exemplary embodiment is described with reference to a flowchart illustrated in FIG. 12. The processing is performed by the CPU 2010 executing the control program read from the ROM 2020 or the HDD 2040 and developed in the RAM 2030.

First, in step S1300, the CPU 2010 executes second authentication processing via the authentication unit 4080 and the local authentication unit 4110. The processing in step S1300 is described with reference to a flowchart illustrated in FIG. 13.

First, in step S1301, the CPU 2010 displays a local authentication screen for receiving inputs of the user name and the password on the display panel of the operation unit 2050.

In step S1302, the CPU 2010 receives the inputs of the user name and the password via the local authentication screen displayed on the display panel of the operation unit 2050.

In step S1303, the CPU 2010 performs local authentication processing via the user name and the password input by the user. The local authentication processing is performed in such a manner that the local authentication unit 4110 detects the inputs of the user name and the password and transmits the detected user name and password to the authentication unit 4080.

In step S1304, the CPU 2010 determines whether the user authentication is successful as a result of the local authentication processing. When determining that the user authentication is successful (YES in step S1304), the CPU 2010 advances the processing to step S1305. On the other hand, when determining that the user authentication fails (NO in step S1304), the CPU 2010 advances the processing to step S1307. In step S1307, the CPU 2010 notifies the user of failure of the authentication. The failure of the authentication may be notified by displaying a message on the display panel of the operation unit 2050. In addition, the failure of the authentication may be notified by sound and light. After the processing in step S1307, the processing returns to step S1302.

In step S1305, the CPU 2010 generates user information which is referred to as a login context valid in the communication. The processing in step S1305 is performed via the local authentication unit 4110. The login context includes information of the user who succeeded in the authentication (for example, the user identification (ID), the user name, and the like). The login context generated in step S1305 is stored until a logout request is received which is described below in step S1202 in FIG. 12.

In step S1306, the CPU 2010 adds the login context generated in step S1305 to the session information generated when the local authentication unit 4110 performs the authentication processing. Accordingly, when the release processing with respect to the print data registered in the print reservation DB 4100 is received, the CPU 2010 can determine the information of the user who requests the release processing from the login context. After the processing in step S1306, the processing proceeds to step S1201 in FIG. 12.

Figure 13:
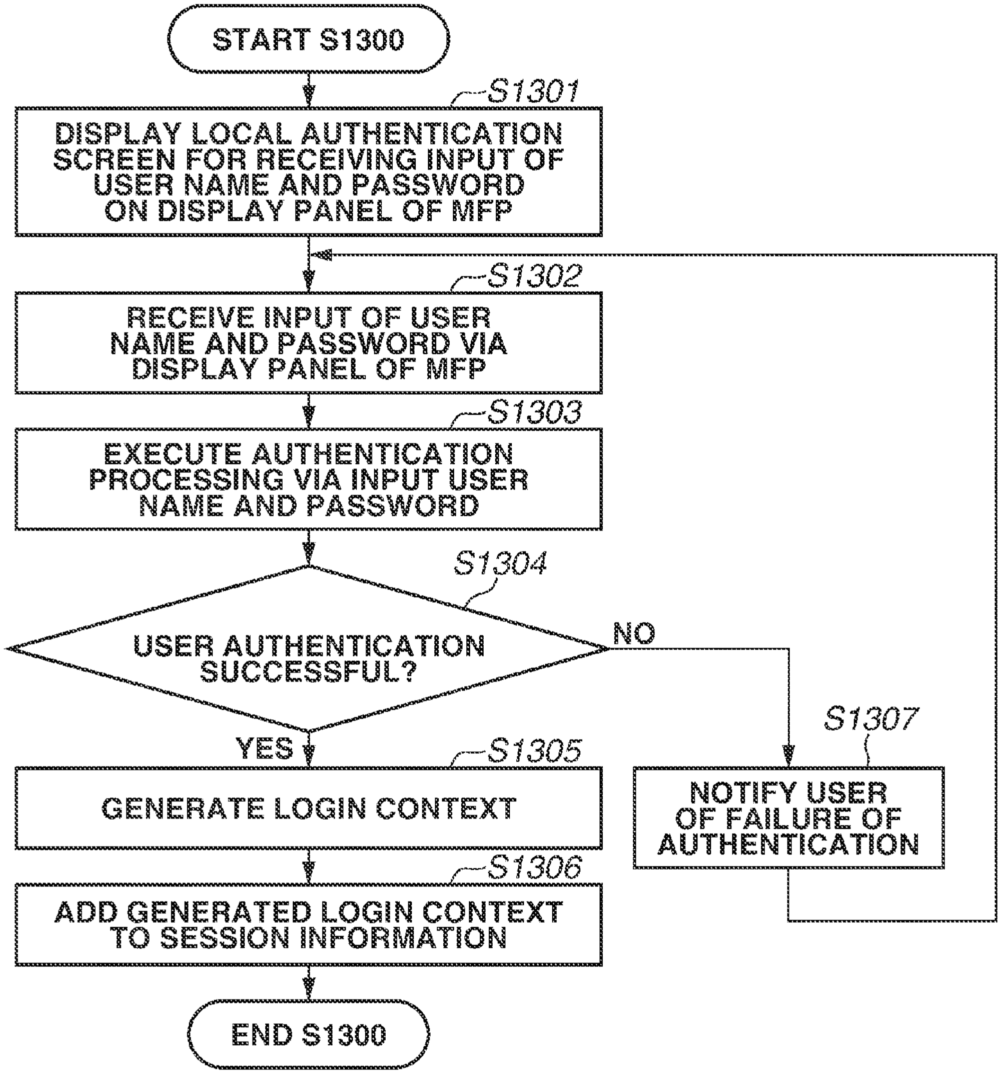
FIG. 13 is a flowchart illustrating an example of control according to the first exemplary embodiment.

In step S1201, the CPU 2010 determines whether a logout request is received. For example, when a user presses the logout key displayed on the display panel of the operation unit 2050, the CPU 2010 determines that the logout request is received. The CPU 2010 may determine that the logout request is received according to elapse of a predetermined time from when the user authentication is successful (i.e., from when the user logged in the MFP) in step S1304 in FIG. 13. When determining that the logout request is received (YES in step S1201), the CPU 2010 advances the processing to step S1207. In step S1207, the CPU 2010 deletes the session information to which the login context generated in step S1305 in FIG. 13 is added via the local authentication unit 4110. In step S1208, the CPU 2010 deletes the login context generated in step S1305 via the local authentication unit 4110. After the processing in step S1208, the CPU 2010 terminates the series of the processing according to FIG. 12.

On the other hand, when determining that the logout request is not received (NO in step S1201), the CPU 2010 advances the processing to step S1202. In step S1202, the CPU 2010 determines whether the print data of the user who succeeded in the authentication by the second authentication processing executed in step S1300 is registered in the print reservation DB 4100. In the example of the above-described table 700 in FIG. 7, print data of a user whose name is "User A" and print data of a user whose name is "User B" are registered in the print reservation DB 4100. For example, when a user name of a user who succeeded in the authentication by the processing in step S1300 is the "User A", a determination result in step S1202 will be "YES". Further, when a user name of a user who succeeded in the authentication by the processing in step S1300 is the "User B", a determination result in step S1202 will be "YES". On the other hand, when a user name of a user who succeeded in the authentication by the processing in step S1300 is a "User C", a determination result in step S1202 will be "NO". The CPU 2010 can obtain the information of the user who succeeded in the authentication by the processing in step S1300 from the login context added to the session information by the processing in step S1306 in FIG. 13.

When determining that the print data of the user who succeeded in the authentication by the processing in step S1300 is registered in the print reservation DB 4100 (YES in step S1202), the CPU 2010 advances the processing to step S1203. On the other hand, when determining that the print data of the user who succeeded in the authentication by the processing in step S1300 is not registered in the print reservation DB 4100 (NO in step S1202), the CPU 2010 returns the processing to step S1201.

In step S1203, the CPU 2010 refers to the print data stored in the document DB 4040 and obtains, from the document DB 4040, the print data which is registered in the print reservation DB 4100 and of the user who succeeded in the authentication by the processing in step S1300.

In step S1204, the CPU 2010 refers to the bibliographic information stored in the bibliographic DB 4060 and obtains, from the bibliographic DB 4060, the print attributes of the print data which is registered in the print reservation DB 4100 and of the user who succeeded in the authentication by the processing in step S1300.

In step S1205, the CPU 2010 executes the print processing based on the print data obtained in step S1203 and the print attributes obtained in step S1204. The processing in step S1205 is performed via the print processing unit 4130. After the processing in step S1205, the processing proceeds to step S1206.

In step S1206, the CPU 2010 deletes the information of the print data on which the print processing is executed in step S1205 from the print reservation DB 4100. After the processing in step S1206, the processing returns to step S1201.

The series of processing for performing the print processing with respect to the print data registered in the print reservation DB 4100 in the MFP 110 according to the first exemplary embodiment is described in detail above.

As described above, according to the first exemplary embodiment to which the present invention is applied, the job processing apparatus transmits to the mobile information terminal information of a job which is received from the information processing apparatus and stored in the storage unit. The mobile information terminal displays the information of the job received from the job processing apparatus and selects a job to be executed by the job processing apparatus via a plurality of information pieces of the displayed jobs. Then, the mobile information terminal instructs the job processing apparatus to execute the selected job in association with identification information of the user in response to that the user is authenticated. Subsequently, the job processing apparatus executes the job which is instructed to be executed by the mobile information terminal and associated with the identification information of the authenticated user in response to that the user who logs in the job processing apparatus is authenticated.

Therefore, a user can select a job to be executed from among a plurality of jobs stored in the job processing apparatus using the mobile information terminal and instruct execution of the selected job in advance, and thus the job can be executed in response to that the user logs in the job processing apparatus. Accordingly, when a job to be executed is searched from among a plurality of jobs and executed, the screen of the job processing apparatus will not be kept occupied by a user, and also a job execution result (for example, a print product) is not left unattended on the job processing apparatus.

The first exemplary embodiment to which the present invention is applied is particularly effective when, for example, a large number of jobs (for example, 100 jobs) is stored in the job processing apparatus, and a job to be executed is to output a large number of print products (for example, 100 sheets of the print products). This is because, the first exemplary embodiment can eliminate the need for a user to keep occupying the screen of the job processing apparatus to find a job to be executed from among a large number of jobs stored in the job processing apparatus and also prevent a large number of print products from being left unattended on the job processing apparatus.

According to the above-described first exemplary embodiment, the example is described (steps S1301 and S1302) in which inputs of a user name and a password are received via the local authentication screen displayed on the display panel of the operation unit 2050 when the above-described second authentication processing in step S1300 in FIG. 13 is executed. On the other hand, according to a second exemplary embodiment, an example is described in which the Bluetooth® communication unit 2110 of the MFP 110 and the Bluetooth® communication unit 3070 of the mobile terminal 120 communicate with each other to obtain a user name and a password used in the authentication processing in step S1303. According to the second exemplary embodiment, a part of the processing is different compared to the first exemplary embodiment, so that the processing different from the first exemplary embodiment is mainly described with reference to FIG. 14.

According to the second exemplary embodiment, the CPU 3010 of the mobile terminal 120 executes a Bluetooth® authentication program. The Bluetooth® authentication program is a program for performing user authentication processing by the mobile terminal 120 communicating with the MFP 110.

Figure 14:
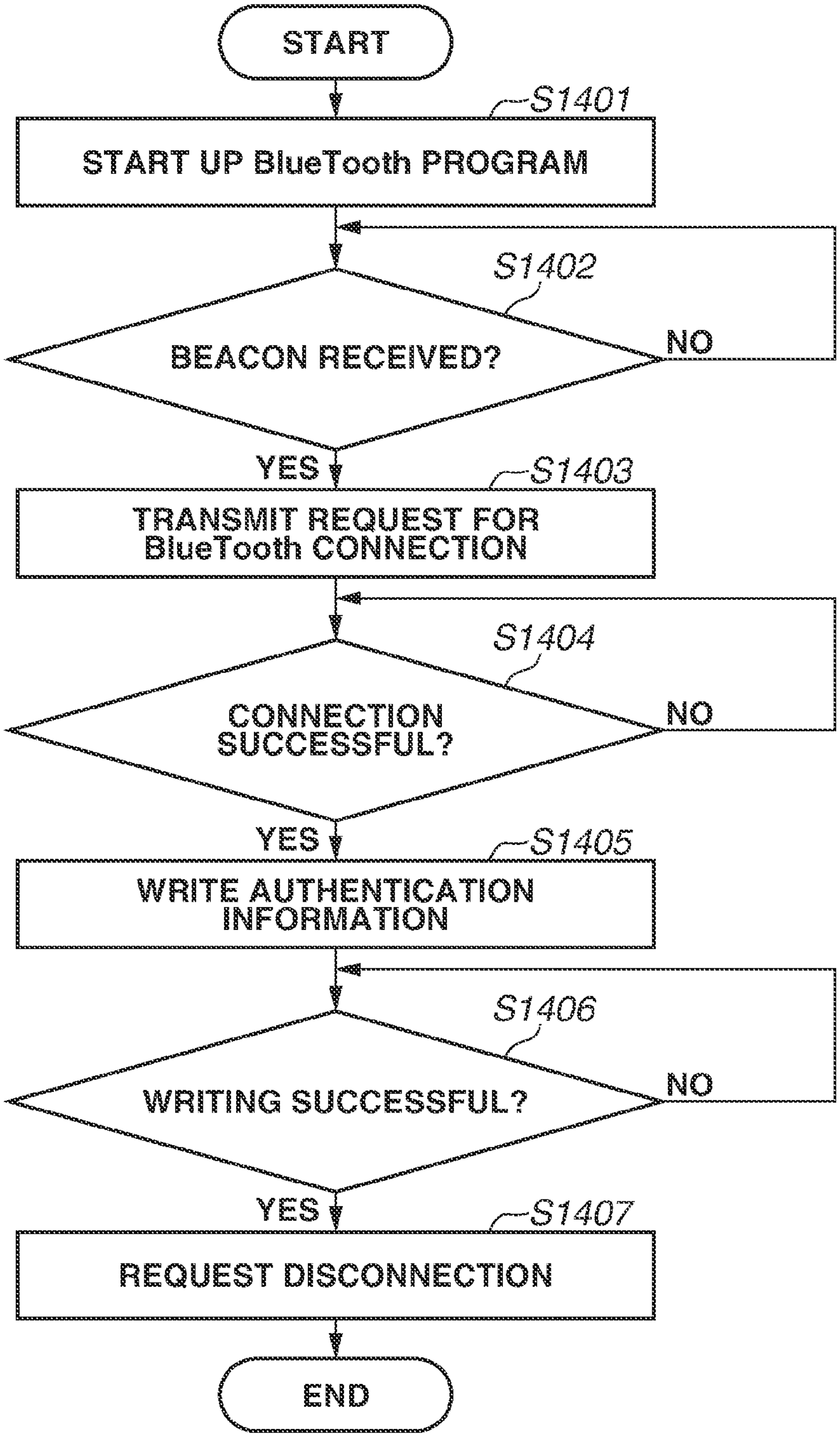
FIG. 14 is a flowchart illustrating an example of control according to a second exemplary embodiment.

A series of processing from when the Bluetooth® authentication program is operated to when the user authentication processing is executed in the mobile terminal 120 according to the second exemplary embodiment is described with reference to a flowchart illustrated in FIG. 14. The processing is performed by the CPU 3010 executing a control program (the Bluetooth® authentication program) read from the ROM 3020 and developed in the RAM 3030. The CPU 2010 of the MFP 110 controls the Bluetooth® communication unit 2110 to publish a service of the Bluetooth® to peripheral Bluetooth® Low Energy (BLE) terminals. The Bluetooth® authentication program executed by the CPU 3010 of the mobile terminal 120 controls the Bluetooth® communication unit 3070 to communicate with the MFP 110 using the published service.

First, in step S1401, the CPU 3010 starts up the Bluetooth® authentication program in response to reception of a user operation via the touch panel 3040. A variation may be adopted in which an instruction to start up the Bluetooth® authentication program in response to that the release processing is requested to the MFP 110 is described in the HTML document generated by the list control unit 4090. In such a case, the web browser interprets and executes the HTML document generated by the list control unit 4090, and thus the CPU 3010 executes the Bluetooth® authentication program.

In step S1401, the CPU 3010 may display, on the touch panel 3040, a message indicating that the mobile terminal 120 moves closer to the MFP 110 which issued the release instruction. In such a case, the message indicating that the mobile terminal 120 moves closer to the MFP 110 which issued the release instruction is displayed until the processing from steps S1401 to S1405 is executed. It is desirable that the message includes information regarding the MFP 110 (for example, a position, a name, and the like).

In step S1402, the CPU 3010 receives an advertise packet (Beacon) transmitted by the MFP 110. In this regard, the CPU 3010 confirms reception of ADV_IND of the Bluetooth® and detects the MFP 110 as a connection destination. When determining that the Beacon is received (YES in step S1402), the CPU 3010 advances the processing to step S1403. On the other hand, the CPU 3010 repeats the processing in step S1402 until the Beacon is received.

In step S1403, the CPU 3010 transmits a request for Bluetooth® connection to the MFP 110. In this regard, CONNECT_REQ is used for the request for the Bluetooth® connection.

In step S1404, the CPU 3010 determines whether the connection to the MFP 110 is successful. When determining that the connection to the MFP 110 is successful (YES in step S1404), the CPU 3010 advances the processing to step S1405. On the other hand, when determining that the connection to the MFP 110 fails (NO in step S1404), the CPU 3010 transmits a connection request to the MFP 110 again. The CPU 3010 repeats the processing in step S1404 until the connection to the MFP 110 is successful. As an exception handling, when failure of the connection request exceeds a predetermined number of times, the processing sequence in FIG. 14 may be terminated. In addition, the CPU 3010 may notify a user of the failure of the connection. The failure of the connection may be notified by displaying a message on the touch panel 3040 or by sound and light.

In step S1405, the CPU 3010 uses Generic Attribute Profile (GATT) communication to try to write the user authentication information (for example, the user name and the password) to the MFP 110. The user name and the password that the CPU 3010 writes to the MFP 110 is stored in the RAM 3030 in advance. It is desirable that the password is stored in an encrypted state in the RAM 3030 in terms of security. In this regard, the mobile terminal 120 operates as an Attribute Protocol (ATT) client and executes writing of a setting value using a Write Request.

In step S1406, the CPU 3010 determines whether writing of the authentication information is successful. Information whether the writing is successful or not is notified by ATT Notification. When determining that the writing is successful (YES in step S1406), the CPU 3010 advances the processing to step S1407. On the other hand, when determining that the writing fails (NO in step S1406), the CPU 3010 tries to perform the writing processing of the setting again. The CPU 3010 repeats the processing in step S1406 until the writing is successful. As an exception handling, when failure of the writing processing exceeds a predetermined number of times, the processing sequence in FIG. 14 may be terminated. In addition, the CPU 3010 may notify a user of the failure of the writing. The failure of the writing may be notified by displaying a message on the touch panel 3040 or by sound and light.

In step S1407, the CPU 3010 executes a disconnection request of the Bluetooth® to the MFP 110. The disconnection request processing is realized by the mobile terminal 120 transmitting an LL_TERMINATE_IND message to the MFP 110. After the processing in step S1407, the CPU 3010 terminates a series of processing sequence in FIG. 14. As described above, the authentication unit 4080 of the MFP 110 receives the user authentication information (for example, the user name and the password) from the mobile terminal 120. Then, the CPU 2010 of the MFP 110 executes the authentication processing (corresponding to step S1303 in FIG. 13) via the user name and the password received from the mobile terminal 120. The processing after the CPU 2010 executes the authentication processing via the user name and the password received from the mobile terminal 120 can be described as with the processing in step S1304 and thereafter in FIG. 13.

The series of processing from when the Bluetooth® authentication program is operated to when the user authentication processing is executed in the mobile terminal 120 according to the second exemplary embodiment is described in detail above. In FIG. 14, the example is described in which the authentication processing is performed using the Bluetooth® communication unit 2110 of the MFP 110 and the Bluetooth® communication unit 3070 of the mobile terminal 120, however, the authentication processing is not limited to this example. A variation may be adopted in which the authentication processing is performed using the NFC communication unit 2100 of the MFP 110 and the NFC communication unit 3060 of the mobile terminal 120. In this case, an NFC module of the mobile terminal 120 is operated in a card emulation mode.

As described above, according to the second exemplary embodiment, the authentication processing is performed by the Bluetooth® communication unit 2110 of the MFP 110 and the Bluetooth® communication unit 3070 of the mobile terminal 120 communicating with each other. In other words, a user who moves while carrying the mobile terminal 120 can perform the authentication processing using proximity wireless communication without operating the display panel of the operation unit 2050 of the MFP 110. Accordingly, the authentication processing is performed when the user who moves while carrying the mobile terminal 120 comes closer to the MFP 110, and the user can execute the print processing of the print data registered in the print reservation DB 4100.

Other Embodiments

The present invention is not limited to the above-described exemplary embodiments and can be modified in various ways without departing from the gist of the present invention. In this respect, the present invention does not intend to exclude other embodiments that are not discussed in this description.

For example, according to the above-described exemplary embodiments, the CPU 2010 in the controller unit 2000 of the MFP 110 is described as a main body of the above-described various types of control, however, the present invention is not limited to this configuration. A print control apparatus, such as an external controller in a different housing from the MFP 110 may be configured to be able to execute a part or all of the above-described various types of control.

Further, for example, according to the above-described exemplary embodiments, the case is described in which the document DB 4040 and the bibliographic DB 4060 are stored in the HDD 2040 of the MFP 110, however, the present invention is not limited to this configuration. A variation may be adopted in which the document DB 4040 and the bibliographic DB 4060 are stored in an external server connected to the MFP 110 and the PC 130 via the network 100. In such a case, the PC 130 may transmit a print job to the external server. Further, the list control unit 4090 may generate the HTML document for controlling the print data based on the bibliographic DB 4060 owned by the external server.

According to aspects of the present invention, a user can select a job to be executed from among a plurality of jobs stored in the job processing apparatus using the mobile information terminal and instruct execution of the selected job in advance, and thus the job can be executed in response to that the user logs in the job processing apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-207190, filed Oct. 21, 2015, which is hereby incorporated by reference herein in its entirety.

What is claimed is:

1. A image forming system comprising:

an information processing apparatus;

a mobile information terminal; and an image forming apparatus configured to receive, from the information processing apparatus, print data associated with user information and to receive, from the mobile information terminal, an instruction of specific print processing based on print data, wherein the image forming apparatus includes an image forming device configured to form an image on a sheet, an operation device configured to receive an operation of an operator, a storage configured to store data, one or more processors, and memory storing instructions that, when executed by the one or more processors, cause the one or more processors to function as:

a storing unit configured to store, in the storage, the print data received from the information processing apparatus, an outputting unit configured to output information of the print data for transmitting to the mobile information terminal, an acquiring unit configured to acquire user identification information of the operator, and an execution unit configured to execute print processing by causing the image forming device to form an image, wherein the execution unit causes the image forming device to form an image based on the received print data associated with user information in a case where (i) the instruction of specific print processing received from the mobile information terminal is for the received print data associated with user information and, (ii) the received print data associated with user information corresponds to the user identification information of the operator acquired by the acquiring unit.

2. The image forming system according to claim 1, wherein, without waiting for the user identification information of the operator to be acquired, the execution unit causes the image forming device to form an image based on specified print data according to receipt of an instruction from the mobile information terminal for print processing different from the instruction of specific print processing.

3. The image forming system according to claim 1, wherein, in response to the image forming apparatus receiving information indicating that the mobile information terminal detected that the mobile information terminal has come close to the image forming apparatus, the acquiring unit acquires the user identification information of the operator.

4. The image forming system according to claim 3, wherein the mobile information terminal detects that the mobile information terminal comes close to the image forming apparatus via communications that comply with the Bluetooth wireless technology standard.

5. An image forming apparatus to communicate with an external apparatus, the image forming apparatus comprising:

an image forming device configured to form an image on a sheet;

an operation device configured to receive an operation of an operator;

a storage configured to store data;

one or more processors; and memory storing instructions that, when executed by the one or more processors, cause the one or more processors to function as:

a storing unit configured to store, in the storage, print data associated with user information received from an external apparatus, an outputting unit configured to output information of the print data for transmitting to an external apparatus, an acquiring unit configured to acquire user identification information of the operator, and an execution unit configured to execute print processing by causing the image forming device to form an image, wherein the execution unit causes the image forming device to form an image based on the received print data associated with user information in a case where (i) an instruction of specific print processing received from the external apparatus to which the information of the print data is transmitted is for the received print data associated with user information and, (ii) the received print data associated with user information corresponds to the user identification information of the operator acquired by the acquiring unit.

6. The image forming apparatus according to claim 5, wherein, in response to the image forming apparatus receiving information indicating that the external apparatus detected that the external apparatus has come close to the image forming apparatus, the acquiring unit acquires the user identification information of the operator.

7. The image forming apparatus according to claim 5, wherein, without waiting for the user identification information of the operator to be acquired, the execution unit causes the image forming device to form an image based on specified print data according to receipt of an instruction from the external apparatus for print processing different from the instruction of specific print processing.

8. The image forming apparatus according to claim 5, wherein the user identification information of the operator is information for identifying a user who has succeeded in user authentication via the operation device.

9. The image forming apparatus according to claim 5, wherein the print data for which the instruction of specific print processing is instructed is registered in a reservation database.

10. The image forming apparatus according to claim 5, wherein the outputting unit is configured to output the information of the print data for transmitting to the external apparatus with respect to print data associated with a user authenticated via the external apparatus.

11. The image forming apparatus according to claim 5, wherein the information of the print data output from the outputting unit includes at least a document name.

12. A method for controlling an image forming apparatus to communicate with an external apparatus, wherein the image forming apparatus wherein the image forming apparatus includes an image forming device configured to form an image on a sheet, an operation device configured to receive an operation of an operator, a storage configured to store data, the method comprising:

storing, in the storage, print data associated with user information received from an external apparatus;

outputting information of the print data for transmitting to an external apparatus;

acquiring user identification information of the operator; and executing print processing by causing the image forming device to form an image, wherein executing includes causing the image forming device to form an image based on the received print data associated with user information in a case where (i) an instruction of specific print processing received from the external apparatus to which the information of the print data is transmitted is for the received print data associated with user information and, as authentication, (ii) the received print data associated with user information corresponds to the acquired user identification information of the operator.

13. The method according to claim 12, wherein the user identification information of the operator is information for identifying a user who has succeeded in user authentication via the operation device.

14. The method according to claim 12, wherein the print data for which the instruction of specific print processing is instructed is registered in a reservation database.

15. The method according to claim 12, wherein outputting the information includes outputting the information of the print data for transmitting to the external apparatus with respect to print data associated with a user authenticated via the external apparatus.

16. The method according to claim 12, wherein the output information of the print data includes at least a document name.

* * * * *